United States Patent
Yanobe

(10) Patent No.: US 9,891,046 B2
(45) Date of Patent: Feb. 13, 2018

(54) ABSOLUTE ROTARY ENCODER FOR SURVEYING DEVICE

(71) Applicant: Kabushiki Kaisha TOPCON, Tokyo (JP)

(72) Inventor: Satoshi Yanobe, Tokyo (JP)

(73) Assignee: Kabushiki Kaisha TOPCON, Tokyo (JP)

(*) Notice: Subject to any disclaimer, the term of this patent is extended or adjusted under 35 U.S.C. 154(b) by 182 days.

(21) Appl. No.: 14/820,219

(22) Filed: Aug. 6, 2015

(65) Prior Publication Data
US 2016/0040988 A1 Feb. 11, 2016

(30) Foreign Application Priority Data
Aug. 7, 2014 (JP) ................. 2014-161744

(51) Int. Cl.
G01C 1/02 (2006.01)
G01D 5/347 (2006.01)
G01D 5/244 (2006.01)

(52) U.S. Cl.
CPC ........... *G01C 1/02* (2013.01); *G01D 5/24438* (2013.01); *G01D 5/3473* (2013.01); *G01D 5/34715* (2013.01); *G01D 5/34776* (2013.01)

(58) Field of Classification Search
CPC ..... G01C 1/02; G01D 5/34776; G01D 5/3473
USPC ........................ 250/231.13–231.18
See application file for complete search history.

(56) References Cited

U.S. PATENT DOCUMENTS 5,589,939 A * 12/1996 Kitajima ............... G01C 15/004
250/559.29
5,640,007 A * 6/1997 Talbott ................. G01D 5/3473
250/231.15
7,589,313 B2 * 9/2009 Nordenfelt ......... G01D 5/34707
250/231.13
7,965,383 B2 * 6/2011 Hayashi ............... G01C 15/004
356/4.01
2002/0105445 A1 8/2002 Shirai et al.
(Continued)

FOREIGN PATENT DOCUMENTS

DE 4105202 C1 8/1992
EP 1995567 A1 11/2008
(Continued)

OTHER PUBLICATIONS

The extended European search report issued by the European Patent Office dated Nov. 30, 2015, which corresponds to European Patent Application No. 15180056.2-1558 and is related to U.S. Appl. No. 14/820,219.

*Primary Examiner* — Seung C Sohn
(74) *Attorney, Agent, or Firm* — Studebaker & Brackett PC

(57) ABSTRACT

An absolute encoder includes a light-emitting mechanism including a light-emitting surface and emitting detection light from the light-emitting surface. A light-receiving mechanism including a scale plate having a scale area and receiving at a light-receiving area the detection light emitted from the light-emitting surface and passing through the scale area of the scale plate. The light-emitting mechanism and the light-receiving mechanism are set to a positional relationship that inclines an irradiation axis extending from the light-emitting surface through the scale area to the light-receiving area relative to a rotation axis direction of the scale plate.

9 Claims, 16 Drawing Sheets

(56) References Cited

U.S. PATENT DOCUMENTS

2004/0113058 A1 6/2004 Sonoki
2009/0108188 A1* 4/2009 Urabe ................ G01D 5/34723
　　　　　　　　　　　　　　　　　　　　　　250/231.1

FOREIGN PATENT DOCUMENTS

EP　　　　2685221 A1　　1/2014
JP　　　2002-013949 A　　1/2002

* cited by examiner

ABSOLUTE ROTARY ENCODER FOR SURVEYING DEVICE

CROSS-REFERENCE TO RELATED APPLICATION

This application is based upon and claims the benefit of priority to Japanese Patent Application No. 2014-161744 filed on Aug. 7, 2014, the entire disclosures of which are incorporated herein by reference.

BACKGROUND

Technical Field

The present invention relates to an absolute encoder using detection light passing through a scale area of a scale plate and a surveying device on which the absolute encoder is installed.

Description of Related Art

In a surveying device to execute surveying, a horizontal angle or vertical angle is often detected by use of an absolute encoder. In the absolute encoder, a scale area of a scale plate is irradiated with detection light emitted from a light-emitting mechanism and the horizontal angle or the vertical angle is detected by receiving the detection light passing through the scale area at the light-receiving mechanism and acquiring a rotation position of the scale plate based on a detection value obtained by the light reception of the detection light (for reference, see Japanese Patent Application Publication No. 2002-13949).

By the way, in the absolute encoder, the light-receiving area of the light-receiving mechanism has reflectivity. Therefore, in the absolute encoder, there is a case that a part of the detection light that irradiates the light-receiving area is reflected on the light-receiving area toward the scale plate and the reflected detection light is reflected again on the scale plate to reach the light-receiving area. The reflected detection light disturbs the appropriate light reception of the detection light passing through the scale area at the light-receiving area (light-receiving mechanism), and the light-receiving mechanism cannot acquire appropriately the detection value. As a result, it is not possible for the absolute encoder to appropriately acquire the rotation position of the scale plate, thereby reducing accuracy in detection of the horizontal angle or the vertical angle.

Therefore, it is considered in the absolute encoder that an anti-reflection film is provided on a back surface (surface facing the light-receiving area) of the scale plate. In such a configuration, if a part of the detection light that irradiates the light-receiving area is reflected on the light-receiving area toward the scale plate, the reflected detection light can be prevented from being reflected again on the scale plate (back surface), thereby preventing the reflected detection light from reaching the light-receiving area.

SUMMARY

However, if the anti-reflection film is provided on the back surface of the scale plate, in the absolute encoder, the provision results in the increase of manufacturing processes and excessive parts, thereby increasing a manufacturing cost.

The present invention is made in view of the above, and an object of the present invention is to provide an absolute encoder and a surveying device installing the absolute encoder capable of suppressing the increase of a manufacturing cost and preventing accuracy in angle detection caused by the reflection of detection light between a light-emitting area and a scale plate from reducing.

To accomplish the above object, an absolute encoder according to an embodiment of the present invention includes a light-emitting mechanism including a light-emitting surface that emits detection light and a light-receiving mechanism including a scale plate having a scale area and a light-receiving area configured to receive the detection light emitted from the light-emitting surface and passing through the scale area of the scale plate. The light-emitting mechanism and the light-receiving mechanism are set to a position relationship that inclines an irradiation axis extending from the light-emitting surface through the scale area to the light-receiving area relative to a rotation axis direction of the scale plate.

DETAILED DESCRIPTION OF EMBODIMENTS

Figure 1:
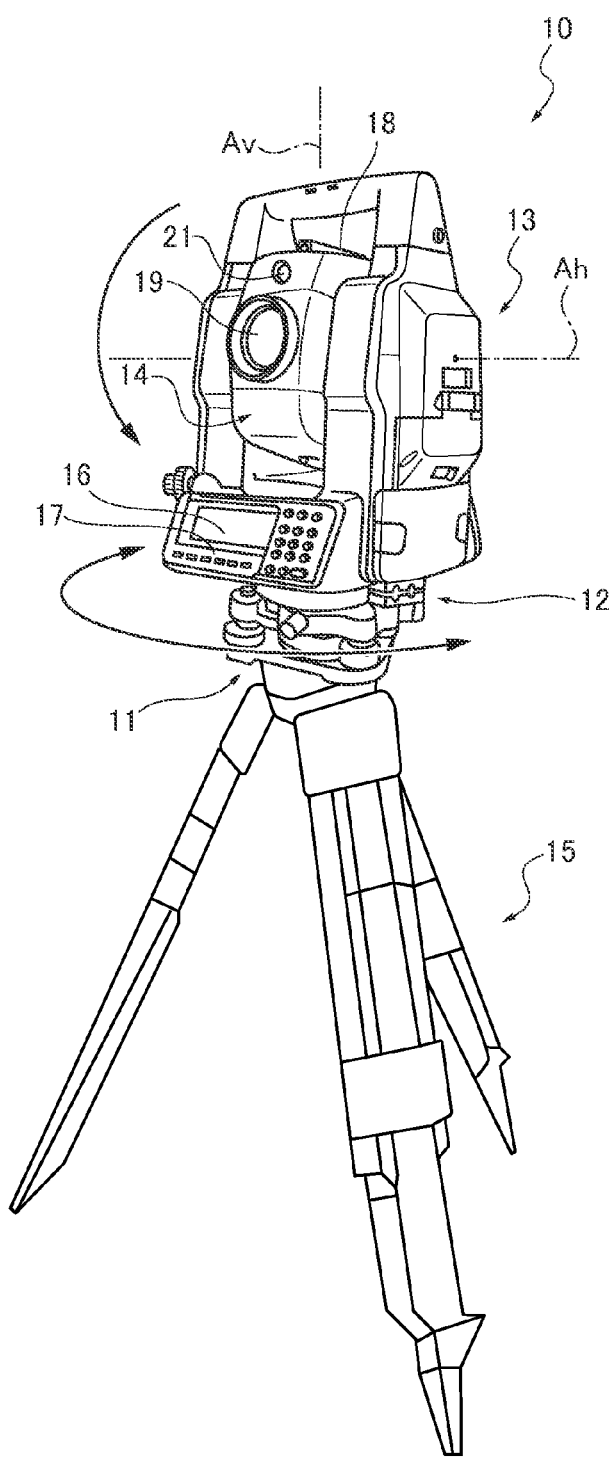
FIG. 1 is a perspective view schematically showing a configuration of a surveying device according to an embodiment of the present invention.

Embodiments of an absolute encoder and a surveying device on which the absolute encoder is installed, according to the present invention will be described hereinafter with reference to the accompanying drawings.

Embodiment 1

A schematic configuration of the surveying device 10 on which, for example, a plurality of absolute encoders 30 according to a first embodiment of the present invention are installed is first described. The surveying device 10 is a total station in the first embodiment and configured to be capable of irradiating a pulse laser light to a measuring point, receiving the pulse reflection light reflected on the measuring point to execute ranging every pulse, and measuring a distance with a high accuracy by averaging a ranging result. The surveying device 10 includes a leveler 11, a base 12, a bracket 13 and a telescope assembly 14.

The leveler 11 is attached to a tripod 15 and can detect the inclination of the surveying device 10 (the telescope assembly 14). The base 12 is provided on the leveler 11 to be capable of changing an inclination angle of the surveying device to the leveler 11. The bracket 13 is provided on the base 12 to be rotatable about a vertical axis $A_v$ relative to the base 12 (rotation about the vertical axis). The bracket 13 is provided with a display part 16 and an operation input part 17.

The operation input part 17 is for employing various functions in the ranging device 10 and outputs input information to a control unit 22 (see FIG. 2) which is described below. The display part 16 displays an operation screen, a measuring result and so on to employ various functions based on the operation made by the operation input part 17 under the control of the control unit 22.

The telescope assembly 14 is provided on the bracket 13 to be rotatable about a horizontal axis $A_h$ relative to the bracket 13 (rotation about the horizontal axis). The telescope assembly 14 is provided with a front and rear sight 18 to set an approximate collimation direction of the surveying device 10. The telescope assembly 14 has a second telescope 19 that collimates an object to be measured and a first telescope 21 that has a magnification lower than that of the second telescope 19 and a visual field wider than that of the second telescope.

The telescope assembly 14 is provided with a first imager that acquires an image (wide-angle image) in the collimation direction or approximately in the collimation direction through an optical system of the first telescope 21 and a second imager that acquires an image (telephoto image) in the collimation direction through an optical system of the second telescope 19. A ranging part sharing the optical system of the second telescope 19 is built in the telescope assembly 14 to emit ranging light and receive reflection light reflected on the object to be measured, thereby executing optical distance measurement of the object to be measured.

In the surveying device 10 as described above, the bracket 13 supports the telescope assembly 14 rotatably about the horizontal axis Ah and the bracket 13 is rotatable about the vertical axis $A_v$ relative to the base 12. Therefore, the telescope assembly 14 is rotatable about the vertical axis $A_v$, or horizontally, and about the horizontal axis $A_h$, or vertically. In the surveying device 10, under the control of the control unit 22 (see FIG. 2) which is described below, the telescope assembly 14 is suitably rotated about the vertical axis Av (horizontal direction) and is suitably rotated about the horizontal axis $A_h$ (horizontal direction).

In the surveying device 10, each of the absolute encoders 30 (see FIG. 2) is provided to detect a rotation angle of the telescope assembly 14 about the vertical axis $A_v$ (horizontal direction) and a rotation angle of the telescope assembly 14 about the horizontal axis $A_h$ (vertical direction). The absolute encoders 30 are described hereinafter in detail.

The control unit 22 (see FIG. 2) that collectively controls an operation of the surveying device 10 is built in the bracket 13. The control unit 22 can direct the telescope assembly 14 in a predetermined direction and scan a predetermined range by controlling the drive of each of a horizontal drive part and a vertical drive part and rotating the bracket 13 and the telescope assembly 14 suitably. The control unit 22 can acquire an image having a predetermined magnification and control the foregoing ranging part to measure a distance to a measuring point by controlling suitably the first imager and the second imager as described above while controlling exchange of the first telescope 21 and the second telescope 19.

The control unit 22 can acquire a horizontal angle and a vertical angle of the telescope assembly 14 (in the collimation direction) by receiving an angle detection signal from the absolute encoder 30. Therefore, in the surveying device 10, the leveler 11, the base 12, the bracket 13, the telescope assembly 14, the front and rear sight 18, the second telescope 19, the first telescope 21 and the absolute encoder (see FIG. 2) functions as a surveying unit driven and controlled by the control unit 22.

In the surveying device 10, for example, two absolute encoders 30 are provided. More specifically, one of the absolute encoders 30 detects the rotation angle of the telescope assembly 14 about the vertical axis Av (horizontal direction) and the other absolute encoder detects the rotation angle of the telescope assembly 14 about the horizontal axis $A_h$ (vertical direction). The one absolute encoder 30 detects the rotation angle of the telescope assembly 14 about the vertical axis $A_v$ (horizontal direction), in other words, the horizontal angle (measurement angle) of the telescope assembly 14 in the collimation direction by detecting a rotation angle of the bracket 13 in the horizontal direction relative to the base 12 or the horizontal rotation angle.

The other absolute encoder 30 detects the rotation angle of the telescope assembly 14 about the horizontal axis $A_h$ (vertical direction), in other words, the vertical angle (measurement angle) of the telescope assembly 14 in the collimation direction by detecting the rotation angle of the telescope assembly 14 in the vertical direction relative to the bracket 13 or the vertical rotation angle.

The absolute encoders 30 have similar configurations and similar operations to each other excepting that an arrangement relationship of them is different in accordance with a difference of the detected angle (horizontal angle or vertical angle) by each of the absolute encoders. Therefore, identical reference numbers are attached to similar parts and the absolute encoders are described.

In each absolute encoder 30, a light-emitting mechanism 32 and a light-receiving mechanism 33 are provided to make a pair by placing a scale plate 31 therebetween. Thus, a combination (detection mechanism) of the light-emitting mechanism 32 and the light-receiving mechanism 33 is formed in in each absolute encoder 30. As a result, two sets of detection mechanisms are arranged to form opposite detection configurations which become rotational symmetry with respect to a setting position of a rotation center of the scale plate 31. Therefore, in the surveying device 10, the one scale plate 31, the two light-emitting mechanisms 32 and the two light-receiving mechanisms 33 are provided to detect the horizontal angle and the vertical angle. In each absolute encoder 30, the scale plate 31 and the pair of light-emitting mechanism 32 and light-receiving mechanism 33 are configured to be relatively rotatable.

In the first embodiment, the scale plate 32 in each absolute encoder 30 is rotatable relative to the pair of light-emitting mechanism 32 and light-receiving mechanism 33. In other words, in the one absolute encoder 30, the scale plate 31 is configured to rotate as the bracket 13 rotates horizontally relative to the base 12 and to rotate as the telescope assembly 14 rotates vertically relative to the bracket 13 in the other absolute encoder 30. In the following, a direction parallel to a direction where a rotation axis of the scale plate 31 in each of the two absolute encoders 30 extends (in one hand, the vertical axis $A_v$ and in other hand, the horizontal axis $A_h$) is defined as a rotation axis direction $D_a$.

Figure 3:
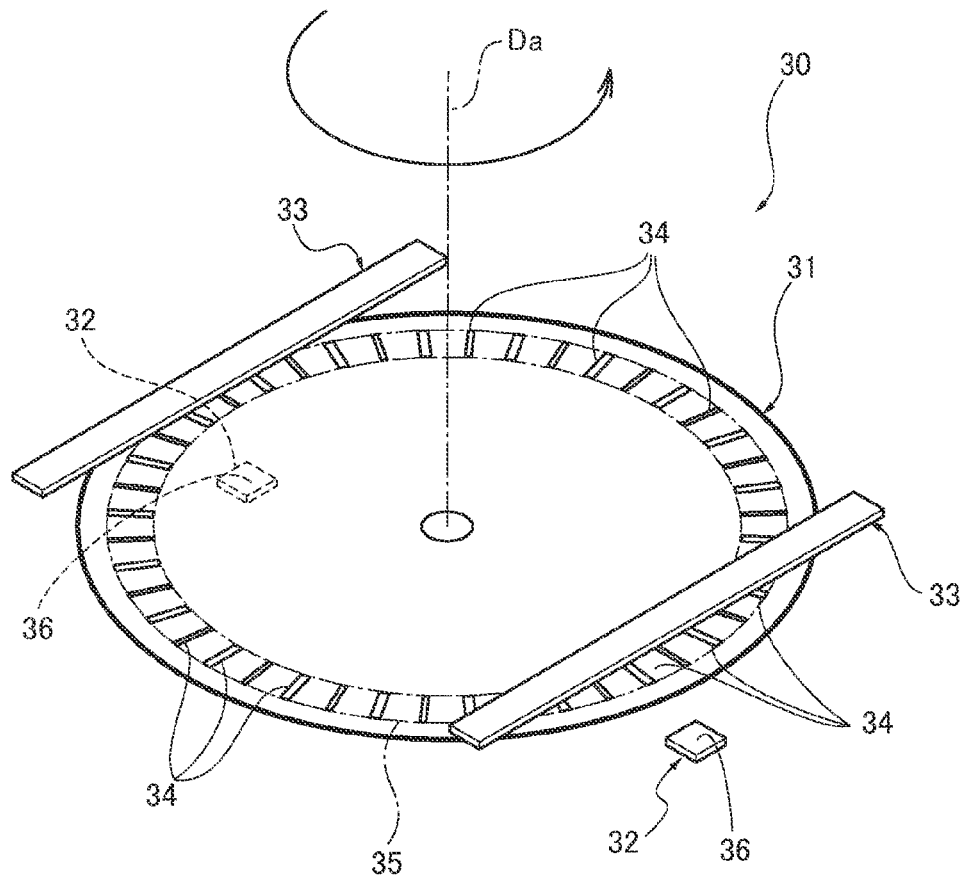
FIG. 3 is a perspective view schematically showing a state where two sets of light-emitting mechanisms and light-receiving mechanisms form pairs placing a scale plate therebetween in each absolute encoder.

The scale plate 31 has a generally disc-like shape as shown in FIG. 3 and is configured to have slits 34 as a plurality of scales arranged at fixed intervals (pitches) along a circumferential direction (relative rotation direction) on an outer circumferential edge portion of the scale plate. Each slit 34 has a part passing through detection light L (see FIG. 4) emitted from each light-emitting mechanism 32 as described below. In the first embodiment, the slits are configured to alternately arrange ones of sizes having a large width and a small width as viewed in the circumferential direction of the scale plate.

Each slit 34 is configured such that, when each light-receiving mechanism 33 receives the detection light L (see FIG. 4 and so on) transmitting the slit, an analog light-receiving signal I a (see FIG. 2) (analog image data) for one line based on light-receiving throughout all of light-receiving areas 33a (see FIG. 8 and so on) as described below does not coincide with an analog light-receiving signal I a (analog image data) for one line at other either place as viewed in the circumferential direction. Therefore, band-like areas provided by the slits 34 along the circumferential direction form a scale area 35 in which the slits 34 as the scales are provided to detect a rotation position of the scale plate 31. In the first embodiment, the scale plate 31 is configured to block the transmission of light (the detection light L) (see FIG. 4 and so on) as a whole by applying chrome plating on a disc-shaped glass plate and is adapted to form each slit 34 by removing the chrome plating partially by etching and so on (see FIG. 4 and so on).

Figure 4:
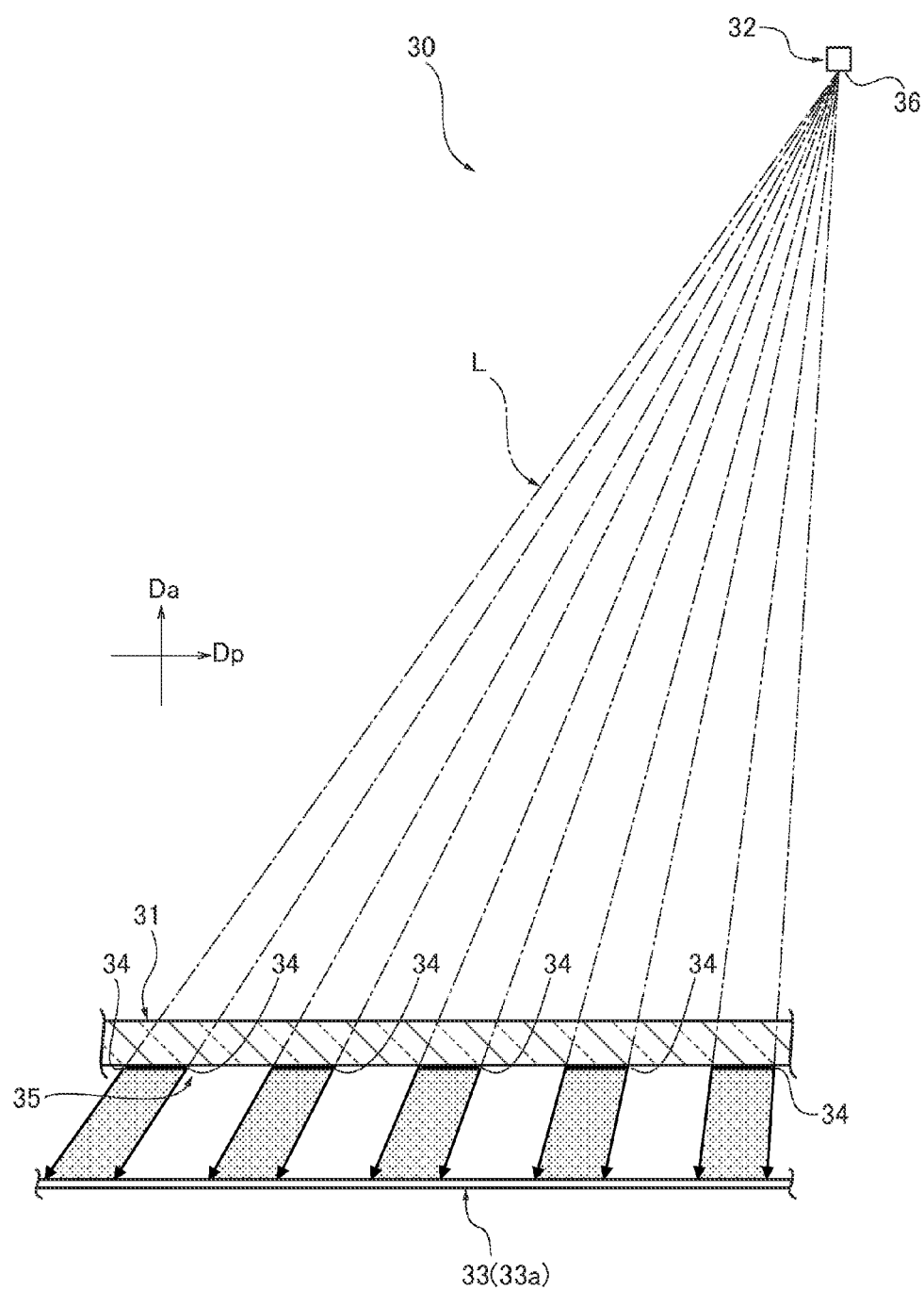
FIG. 4 is an explanatory view showing a state where the light-receiving mechanism receives light emitted from the light-emitting mechanism and passing through the scale plate (slits).

Each light-emitting mechanism 32 and each light-receiving mechanism 33 are provided to face each other by placing the scale area 35 (an area where the slits 34 are provided) therebetween. The light-emitting mechanism 32 emits the detection light L toward the scale area 35 in the scale plate 31 under a control mechanism 37 described below (see FIG. 2), as shown in FIG. 4. In the first embodiment, the light-emitting mechanism 32 is configured by use of one or more light-emitting diodes. Therefore, in the first embodiment, a light-emitting surface (emission surface) of the light-emitting diode (light-emitting mechanism 32) functions as the emission surface 36 that emits the detection light L in the light-receiving mechanism 32.

The light-receiving mechanism 33 receives at the light-receiving area 33a (see FIG. 8 and so on) the detection light L emitted from the light-emitting mechanism 32 (emission surface 36) and passing through the scale area 35 (slits 34) of the scale plate 31 under the control of the control mechanism described below and outputs the analog light-receiving signal I a (see FIG. 2) in accordance with a light-receiving amount to the control mechanism 37. The light receiving mechanism 33 is a one-dimensional solid-state imaging sensor (linear image sensor) configured to have the linear light-receiving area 33a (see FIG. 8 and so on) by arranging linearly a plurality of light-receiving elements in series. In the following, a direction (a direction where the light-receiving elements are arranged in series) where the light-receiving area 33a (light-receiving mechanism) extends is defined as a light-receiving axis direction $D_p$. The light-receiving mechanism 33 is provided such that the light-receiving axis direction $D_p$ is positioned in a direction parallel with a chord of the disc-like shape with respect to the scale plate 31 of the disc-like shape.

In the first embodiment, the light-receiving mechanism 33 is configured by use of a CMOS (Complementary Metal Oxide Semi-Conductor) image sensor. In the light-receiving mechanism 33, 2,000 light-receiving elements are arranged in series to form the light-receiving area 33a (see FIG. 8 and so on), thereby outputting analog light-receiving signals I a for 2,000 pixels. In the first embodiment, the light-receiving mechanism 33 is configured to take a position relationship capable of receiving the detection light L passing through 60 slits 34 of the scale area 35 in the light-receiving area 33a (see FIG. 8 and so on) for the 2000 pixels.

In each absolute encoder 30, when the detection light L is emitted (irradiated) from the light-emitting mechanism 32, the detection light L passing through the slits 34 in the scale area 35 of the scale plate 31 reaches the light-receiving mechanism 33, and the detection light L does not reach a portion where silts 34 are not provided. Therefore, in the light-receiving mechanism 33, images as image data of the scale area 35 (each slit 34) in a position according to the rotation position of the scale plate 31 can be acquired by acquiring the analog light-receiving signals I a (see FIG. 2) at the entire area of the light-receiving area 33a formed by the plurality (2,000 in the first embodiment) of light-receiving elements (pixels) arranged in series. That is to say, in the light-receiving mechanism 33, the analog image data as the images of the slits 34 which are read scales of the scale plate 31 are formed by handling collectively the analog light-receiving signals I a for one line from each light-receiving element (pixel).

In the first embodiment, the analog image data draw a waveform according to each slit 34, because the light-receiving mechanism 33 receives the detection light L passing through each slit 34 of the scale area 35 of the scale plate 31. The light-receiving mechanism 33 outputs the analog light-receiving signals I a for the plurality of pixels as detection values to the control mechanism 37 (see FIG. 2).

Figure 2:
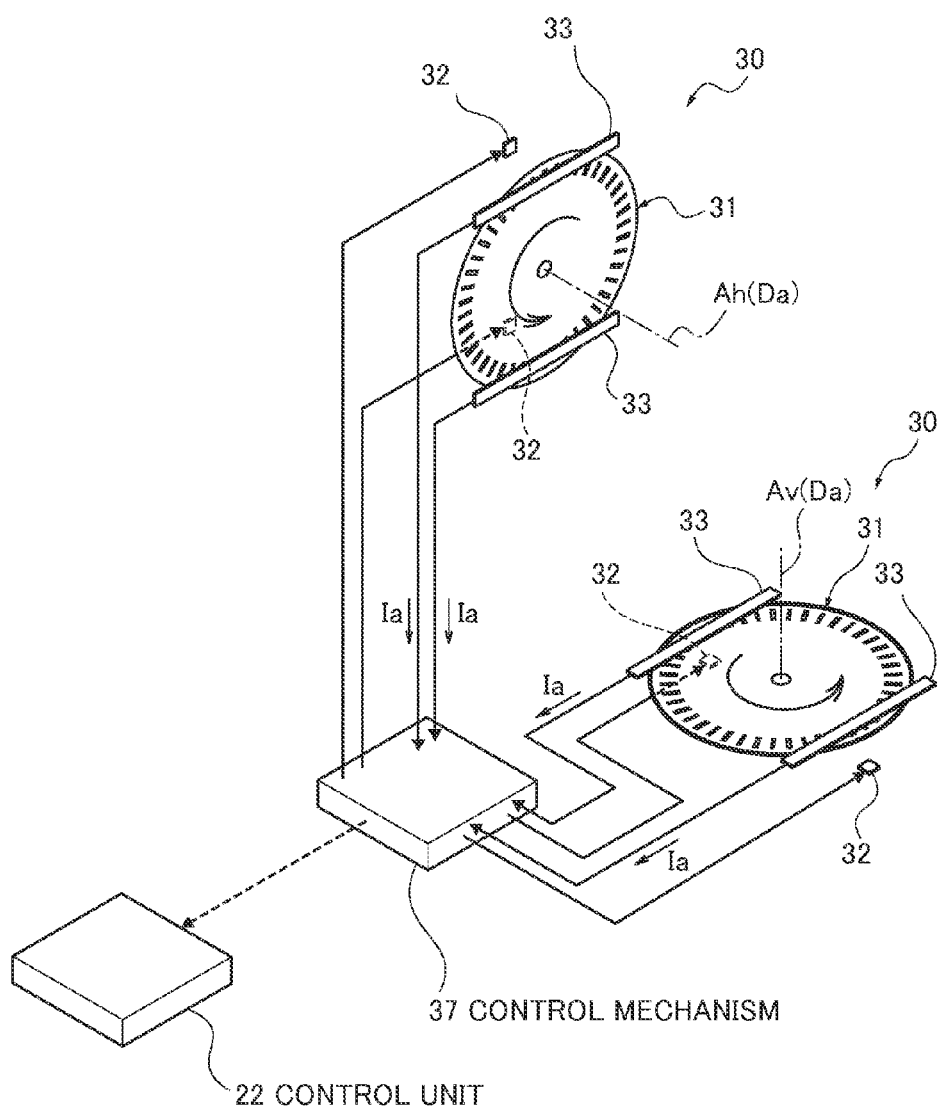
FIG. 2 is a perspective view schematically showing a configuration of absolute encoders installed on the surveying device.
Figure 5:
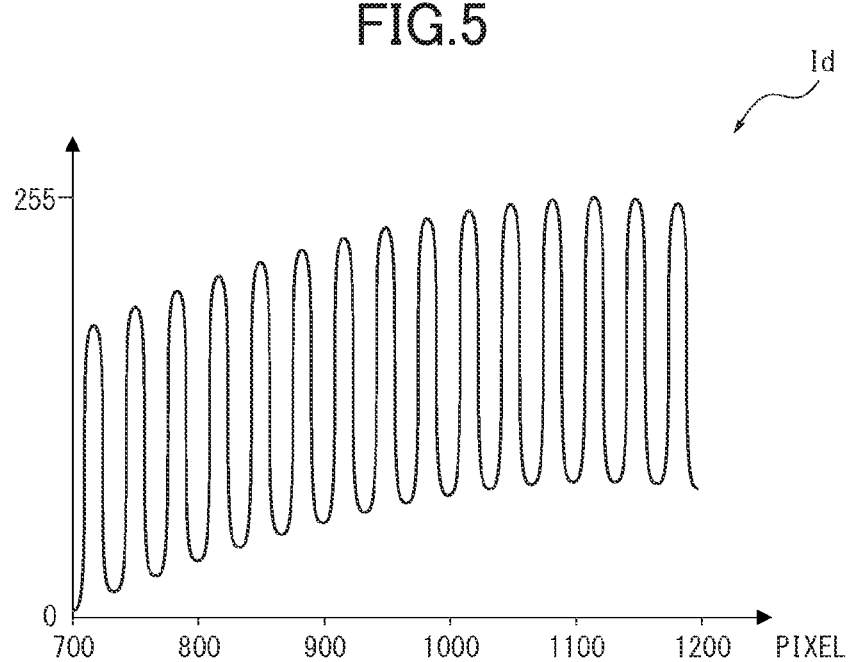
FIG. 5 is a graph showing one example of a digital light-receiving signal as digital image data showing light-receiving contents at the light-receiving mechanism, in which a vertical axis shows a digital level value and a horizontal axis shows a pixel number.

The control mechanism 37 collectively controls operation in each absolute encoder 30 and has a function to calculate the rotation position of the scale plate 31 based on the detection values (analog light-receiving signals I a) from each light-receiving mechanism 33. The control mechanism 37 A-D converts the analog light-receiving signals I a into digital light-receiving signals I d (see FIG. 5 and so on), and detects the rotation position of the scale plate 31 by use of the generated digital light-receiving signals I d, after the detection values (analog light-receiving signals I a) from each light-receiving mechanism 33 are input and amplification, noise elimination an so on are made to the analog light-receiving signals I a, as shown in FIG. 2. The digital light-receiving signals I d show an output value every pixel in the harmony of 0 to 255 in a digital level value (see FIG. 5).

Because the digital light-receiving signals I d are converted by the A-D conversion from the analog light-receiving signals that form analog image data, it is possible to acquire the digital image data drawing the waveform according to each slit 34 of the scale area 35 by collectively handling the one line (the entire area of the light-receiving area) from each light-receiving element (pixel). Here, because the light-receiving mechanism 33 is capable of receiving the detection light L (see FIG. 4 and so on) passing through 60 slits 34 in the light-receiving area 33a formed by the 2,000 pixels, as described above, waveforms having 60 mountains appear in the digital image data (the same, also, in the analog image date).

Figure 6:
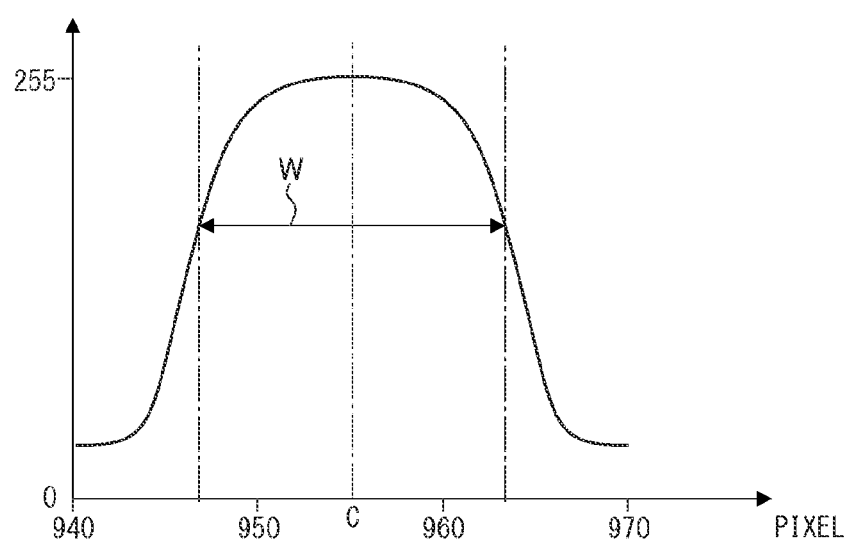
FIG. 6 is a graph showing one example of a digital light-receiving signal corresponding to one slit in FIG. 5, in which a vertical axis shows a digital level value and a horizontal axis shows a pixel number.

The control mechanism 37 (see FIG. 2) calculates a center position C and a width size W of each mountain in the digital image data (digital light-receiving signals I d for one line), as shown in FIG. 6. The calculation of the center position C and the width size W can be executed by various kinds of methods that are performed generally. Accordingly, a further description thereof is omitted. The control mechanism 37 detects the rotation position of the scale plate 31 by demanding a form of the plurality of slits 34 acquired in the light-receiving mechanism 33 based on the center position C and the width size W of each mountain, as thus calculated. Because the demand for the form of the plurality of slits 34 and the detection of the rotation position of the scale plate 31 can be executed by use of various kinds of methods that are performed generally, a further description thereof is omitted. Because the two sets of light-receiving mechanisms are provided in each absolute encoder 30, the detection of the rotation position of the scale plate 31 based on outputs from the two sets of light-receiving mechanisms 33 makes it possible to cancel angle detection error caused by axis blurring in the scale plate 31 and hence detect the rotation position of the scale plate 31 with a high accuracy.

Thereby, in the one absolute encoder 30, by detecting the rotation position of the corresponding scale plate 31 based on the outputs from the two sets of light-receiving mechanisms 33, it is possible to detect (measurement of angle) the horizontal angle of the telescope assembly 14 in the collimation direction. In the other absolute encoder 30, by detecting the rotation position of the corresponding scale plate 31 based on the outputs from the two sets of light-receiving mechanisms 33, it is possible to detect (measurement of angle) the vertical angle of the telescope assembly 14 in the collimation direction.

Figure 7:
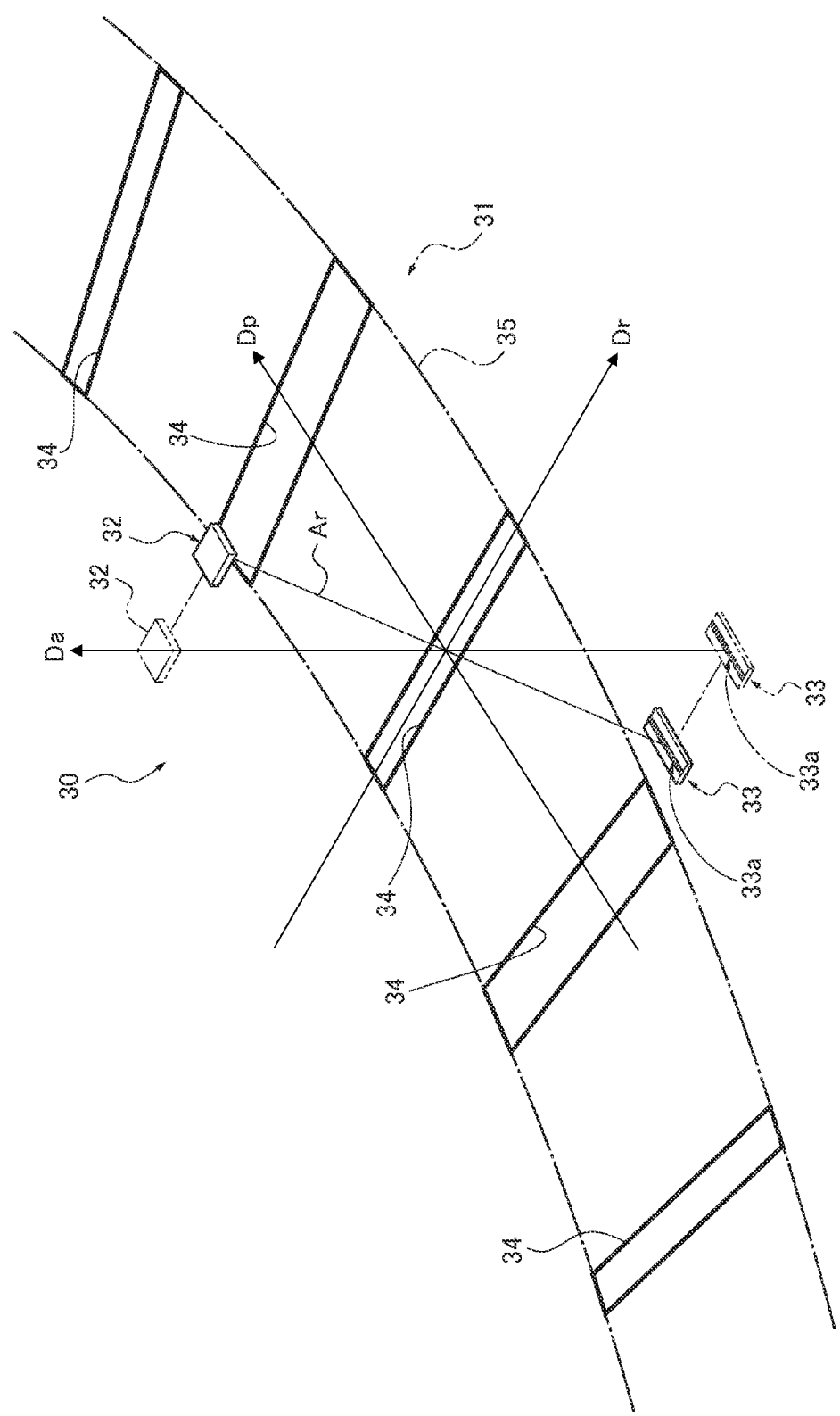
FIG. 7 is an explanatory view explaining a position relationship between each light-emitting mechanism and each light receiving mechanism which form a pair by placing the scale plate therebetween.

Next, a characteristic configuration of the absolute encoder 30 according to the embodiment of the present invention is described with reference to FIGS. 7 to 11, mainly. FIG. 7 is an explanatory view for explaining a position relationship between the light-emitting mechanism 32 and the light-receiving mechanism 33 configured to make the pair by placing the scale plate 31 therebetween. FIG. 7 illustrates the rotation axis direction $D_a$ and the light-receiving direction $D_p$ which are orthogonal each other in a three dimensional orthogonal coordinate around the center position of the scale area 35 (each slit 34) viewed in a radial direction $D_r$ of the scale plate 31 as the origin. In FIG. 7, an outer circumferential side of the scale plate 31 is set as a positive side of the radial direction $D_r$ and a side where the light-emitting mechanism 32 is positioned relative to the scale plate 31 is set as the positive side of the rotation axis direction $D_a$.

Note that FIG. 7 illustrates the light-receiving mechanism 33 with a length dimension in the rotation axis direction Da being reduced to facilitate understanding of the position relationship between the light-emitting mechanism 32 and the light-receiving mechanism 33 and illustrates schematically the scale plate about the scale area 35 and the each slit 34 only. Consequently, it should be noted that the scale plate shown in FIG. 7 does not necessarily correspond to an actual size.

Figure 8:
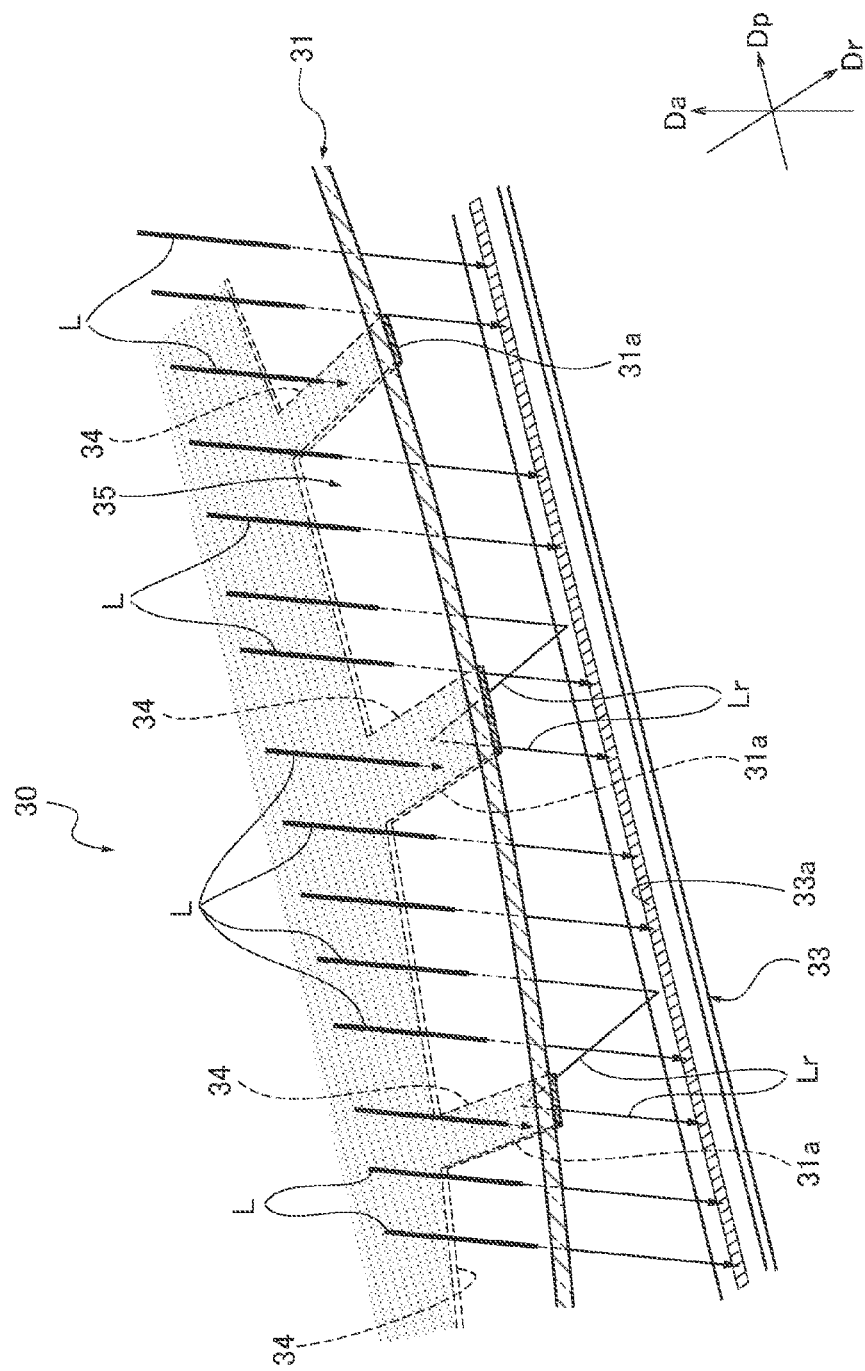
FIG. 8 is an enlarged explanatory view showing partially a state where detection light emitted from the light-emitting mechanism (emission surface) passes a plane including a rotation axis direction and a light-receiving axis direction and is received at a light-receiving area of the light-emitting mechanism through a scale area (each slit) of the scale plate and a state where reflection detection light is received at the light-receiving area.
Figure 10:
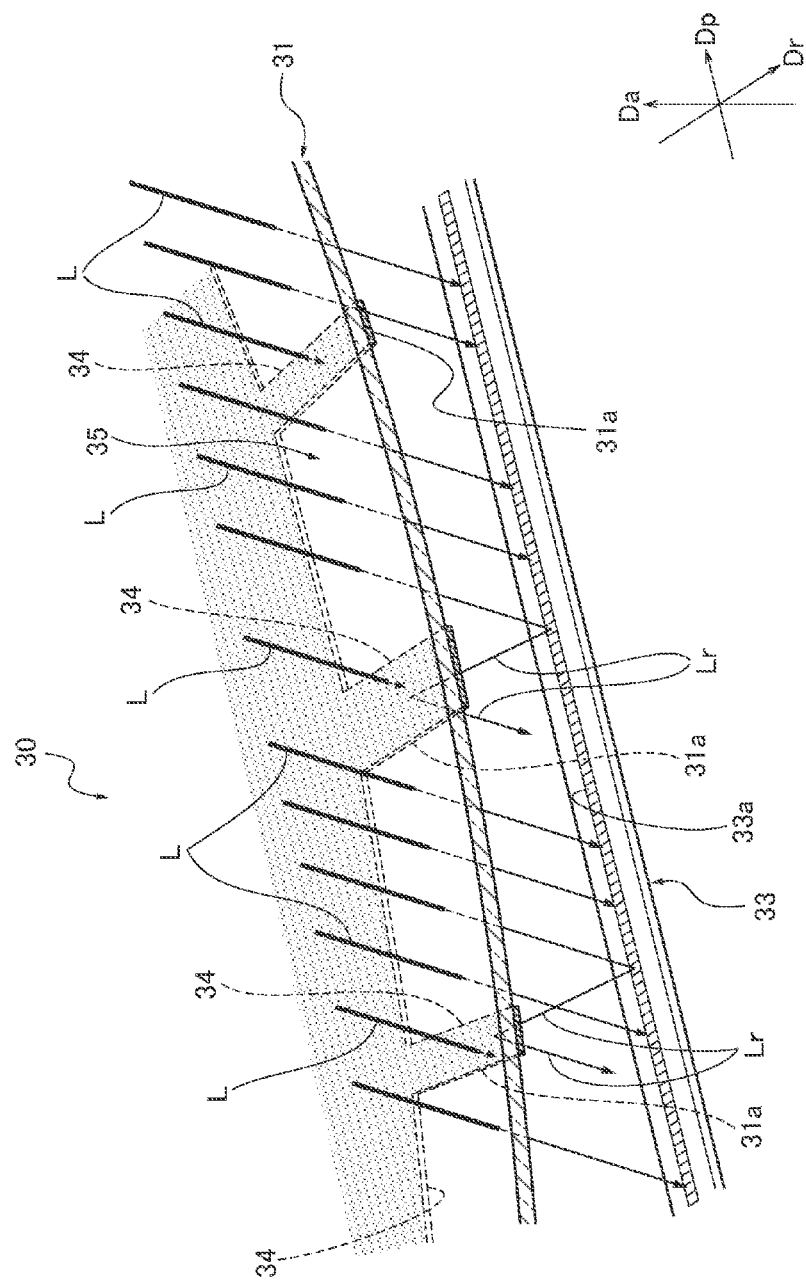
FIG. 10 is an enlarged explanatory view similar to FIG. 8 showing partially a state where the detection light emitted from the light-emitting mechanism (emission surface) passes a plane including the rotation axis direction and the light-receiving axis direction and is received at the light-receiving area of the light-emitting mechanism passing through the scale area (each slit) of the scale plate and a state where the reflection detection light does not reach the light-receiving area.

FIGS. 8 and 10 illustrate schematically a state where the detection light L from the light-emitting mechanism 32 (emission surface 36) is received at the light-receiving area 33a of the light-receiving mechanism 33 passing through the scale area 35 (each slit 34) of the scale plate 31 and a state where the reflection detection light $L_r$ advances to facilitate understanding thereof. Accordingly, these states do not necessarily correspond to an actual form and other drawings.

In the absolute encoders 30, the position relationship between the light-emitting mechanism 32 and the light-receiving mechanism 33 which make the pair by placing the scale plate 31 therebetween is set to incline an irradiation axis $A_r$ relative to the rotation axis direction $D_a$, as shown in FIG. 7. The irradiation axis $A_r$ shows a center position (optical axis) of the detection light L (see FIG. 4 and so on) irradiated from the emission surface 36 of the light-emitting mechanism 32 passing through the scale area 35 (each slit 34) of the scale plate 31 to the light-receiving area 33a of the light-receiving mechanism 33. In the first embodiment, the irradiation axis $A_r$ is a liner line extending from a center position of the emission surface 36 of the light-emitting mechanism 32 through the scale area 35 (each slit 34) of the scale plate 31 to a center position of the light-receiving area 33a of the light-receiving mechanism 33. The rotation axis direction $D_a$ is parallel to the rotation center (vertical axis $A_v$ or horizontal axis $A_h$) of the scale plate 31, as described above. In the first embodiment, the light-emitting mechanism 32 (emission surface 36) is located on the positive side (outer side as viewed in the radial direction $D_r$) of the radial direction $D_r$ than the scale area 35 (each slit 34 center position as viewed in the radial direction $D_r$) of the scale plate 31 and the light-receiving mechanism 33 (light-receiving area 33a) is located on the negative side (inner side as viewed in the radial direction $D_r$) of the radial direction $D_r$ than the scale area 35 (each slit 34 (center position as viewed in the radial direction $D_r$) of the scale plate 31.

In addition, in the first embodiment, the irradiation axis $A_r$ is inclined relative to the rotation axis direction $D_a$ to incline relative to a plane (plane including the rotation axis direction $D_a$ and parallel to the light-receiving axis direction $D_p$) including the rotation axis direction Da and the light-receiving axis direction $D_p$. A degree of the inclination of the irradiation axis is set so as to prevent reflected detection light $L_r$ reflected on the light-receiving area 33a from reaching the light-receiving area 33a, even if the reflected detection light L is reflected on a back surface 31a (see FIG. 11 and so on) of the scale plate 31, as described below, in consideration of the position relationship between the scale plate 31 (back surface 31a) and the light-receiving area 33a of the light-receiving mechanism 33. In the first embodiment, the degree of the inclination is set to prevent the reflected detection light $L_r$ (outer-end reflection detection light $L_{re}$ described below (see FIG. 11 and so on)) reflected on an end portion of the positive side of the radial direction $D_r$ from reaching the light-receiving area 33a in a case where the reflected detection light is reflected on the back surface 31a, because the light-emitting mechanism 32 (emission surface 36) is located on the positive side of the radial direction $D_r$ than the light-receiving mechanism 33 (light-receiving area 33a).

In this way, in the absolute encoders 30 according to the first embodiment, the inclination of the irradiation axis $A_r$ relative to the rotation axis direction Da makes it possible to prevent accuracy of detection caused by the reflection of the detection light L between the light-receiving area 33a of the light-receiving mechanism 33 and the scale plate 31 from being reduced. In the following, the reduction of accuracy of angle detection caused by the reflection of the detection light L between the light-receiving area 33a of the light-receiving mechanism 33 and the scale plate 31 is first described. The reduction of accuracy of angle detection occurs even in the absolute encoders 30 even if the irradiation axis $A_r$ is parallel to the rotation axis direction D. Therefore, the same reference numbers as in the absolute encoders 30 in the first embodiment are used and described with reference to FIG. 7 to FIG. 9 mainly.

In the absolute encoders 30, the position relationship between the light-emitting mechanism 32 and the light-receiving mechanism 33 is set to be parallel the irradiation axis $A_r$ relative to the rotation axis direction $D_a$. In this case, the light-emitting mechanism 32 and the light-receiving mechanism 33 is positioned on the rotation axis direction $D_a$, as shown by two-dot chain line in FIG. 7. Here, the detection light L emitted from the light-emitting mechanism 32 (emission surface 36) has a predetermined expansion (see FIG. 4). Therefore, the detection light passes the plane including the rotation axis direction $D_a$ and the light-receiving axis direction $D_p$ and is received at the light-receiving area 33a of the light-receiving mechanism 33 passing through the scale area 35 (each slit 34) of the scale plate 31. FIG. 8 shows this state by enlarging partially. Light of the detection light L passing through the plane including the rotation axis direction $D_a$ and the light-receiving axis direction $D_p$ is received at the light-receiving area 33a of the light-receiving mechanism 33 passing through the scale area 35 (each slit 34) of the scale plate 31.

By the way, in the light-receiving mechanism 33, the light-receiving area 33a has a reflectivity, that is to say, optical property for reflecting light (detection light L). Therefore, a part of the detection light L going to the light-receiving area 33a directs to the scale plate 31 (back surface 31a) as the reflection detection light $L_r$ reflected on the light-receiving area 33a. In the scale plate 31, a portion in the back surface 31a where each slit 34 is not provided is configured to have a reflectivity. In the foregoing example, the scale plate 31 is configured to block transmission of light entirely by applying chrome plating to a disc-shaped glass plate and form each slit 34 by removing partially the chrome plating. The chrome plating has optical property reflecting the detection light L (similarly, the reflection detection light $L_r$). Therefore, in the scale plate 31, if the reflection detection light $L_r$ reaches a portion of the chrome plating where the slits 34 are not provided in the back surface 31a, the back surface 31a (chrome plating) reflects the reflection detection light $L_r$. As a result, the reflection detection light $L_r$ travels to the light-receiving area 33a of the light-receiving mechanism 33 again and received at the light-receiving area 33a.

Figure 9:
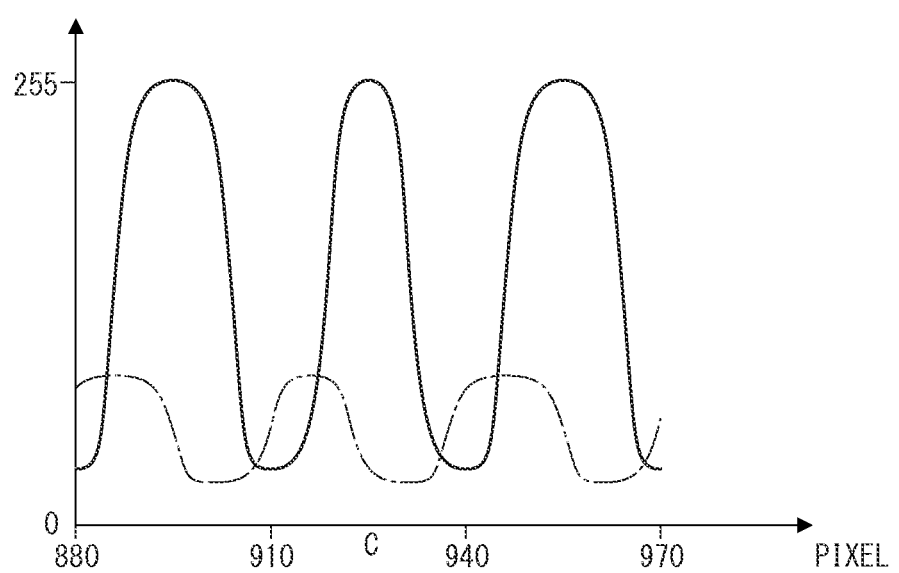
FIG. 9 is a graph showing one example of a digital light-receiving signal as digital image data showing light-receiving contents at the light-receiving mechanism and one example of a digital light-receiving signal when the reflection detection light is received, in which a vertical axis shows a digital level value and a horizontal axis shows a pixel number.

Here, in the light-receiving mechanism 33 (light-receiving area 33a), the image of each slit 34 which is the scale of the scale plate 31 is read by receiving only the detection light L reaching the light-receiving mechanism 33 passing through each slit 34. Therefore, the detection value in the light-receiving mechanism (light-receiving area 33a) forms the analog image data drawing the waveform according to each slit 34, as shown in FIG. 9. From this, if the reflection detection light $L_r$ occurred between the light-receiving area 33a and the scale plate 31 is received at the light-receiving area 33a of the light-receiving mechanism 33, light different from the image of each slit 34 is detected, and hence it is difficult to acquire suitably the analog image data drawing the waveform according to each slit 34. In other words, when the reflection detection light $L_r$ is received at the light-receiving area 33a, this causes the reduction of contrast between each slit 34 transmitting the reflection detection light L in the image of the scale area 35 acquired in the light-receiving area 33a and the portion where the reflection detection light L around the slit is not transmitted. Therefore, in the absolute encoders 30, it is not possible to suitably acquire the rotation position of the scale plate 31, thereby reducing the detection accuracy of the angles (horizontal angle, vertical angle and so on).

In particular, in the scale plate 31 (scale area 35), because the slits 34 are arranged at the fixed intervals (pitches), the portion of the chrome plating where the slits are not provided also are arranged at fixed intervals (pitches) (see FIG. 3 and so on). Therefore, the reflection detection light $L_r$ occurs in a form similar to the form where each slit 34 is provided, between the light-receiving area 33a and the scale plate 31. Accordingly, the light-receiving mechanism 33 (light-receiving area 33a) acquires image data of false images (so-called ghosts) of the slits 34 caused by reflection detection light $L_r$ similar to the waveform according to each slit 34, as shown by a one-dot chain line in FIG. 9. As a result, the light-receiving mechanism 33 (light-receiving area 33a) outputs a total of the image data drawn by a solid line and the image data drawn by the one-dot chain line as the detection value (analog light-receiving signal I a). The image data drawn by the one-dot chain line is difficult to remove from the output detection value (analog light-receiving signal I a), because a position or form appeared according to the position relationship between the scale area 35 (each slit 34) to the light-emitting mechanism 32 (emission surface 36) and the light-receiving mechanism 33 (light-receiving area 33a) changes. Consequently, each of the absolute encoders 30 cannot acquire suitably the rotation position of the scale plate 31, thereby reducing the detection accuracy of the angles (horizontal angle or vertical angle).

It is considered that, in the absolute encoder 30, an anti-reflection film is provided on the portion of the chrome plating where the slits 34 are not provided in the back surface 31a of the scale plate 31. As a result, even if a part of the detection light L is reflected on the light-receiving area 33a and the reflection detection light $L_r$ travels to the scale plate 31 (back surface 31a), it is possible to prevent the reflection detection light from being reflected again on the scale plate 31 (back surface 31a) by the anti-reflection film. As a result, it is possible to prevent the reflection detection light $L_r$ from reaching the light-receiving area 33a of the light-receiving mechanism 33 again. It is considered that a chromium oxide plating (a deposited film of chromium oxide) is used for such an anti-reflection film. In the chromium oxide plating, the reflection detection light $L_r$ is prevented from occurring by interfering a component of the reflection detection light reflected on a front surface of the scale plate 31 and a component of the reflection detection light reflected on the chrome plating.

However, the provision of the anti-reflection film results in the adding a step of providing the anti-reflection film after the scale plate 31 is formed, as described above. This causes the increase in the number of the manufacturing processes and the increase in required materials, whereby increasing in manufacturing cost of the absolute encoders 30. In addition, because the chromium oxide plating (deposited film of chromium oxide) is a high cost and has a low yield, the manufacturing cost for the absolute encoders 30 further increases.

The absolute encoders 30 according to the first embodiment are made in view of the above prevent accuracy in detection of angle due to the reflection of the detection light L between the light-receiving area 33a of the light-receiving mechanism 33 and the scale plate 31 from lowering, without providing the anti-reflection film. In each absolute encoder 30, it is possible to prevent the reflection detection light $L_r$ from reaching again the light-receiving area 33a of the light-receiving mechanism 33, as shown in FIG. 10 by inclining the irradiation axis $A_r$ in relation to the rotation axis direction Da, in each absolute encoder 30. More specifically, in the absolute encoders 30, the irradiation axis $A_r$ is inclined to the plane (plane parallel to the light-receiving axis direction $D_p$ and including the rotation axis direction $D_a$) including the rotation axis direction $D_a$ and the light-receiving axis direction $D_p$ (see FIG. 7) and the anti-reflection film is not provided on the scale plate 31. Therefore, when the reflection detection light $L_r$ reflected on the light-receiving area 33a travels to the back surface 31a (chrome plating) of the scale plate 31, the reflection detection light $L_r$ is again reflected on the back surface 31a (chrome plating).

However, in the absolute encoders 30, the irradiation axis $A_r$ is inclined to the plane including the rotation axis direction $D_a$ and the light-receiving axis direction $D_p$ by positioning the light-emitting mechanism 32 (emission surface 36) in the positive side of the radial direction $D_r$ than the light-receiving mechanism 33 (light-receiving area 33a). Therefore, in the absolute encoders 30, by setting suitably the degree of the inclination of the irradiation axis $A_r$, it is possible to travel the reflection detection light $L_r$ reflected again on the back surface 31a of the scale plate 31 toward a portion which is positioned in the negative side of the radial direction $D_r$ than the light-receiving area 33a and is the other portion than the light-receiving area 33a. This causes the detection light to occur throughout the entirety of the light-receiving area 33a as viewed in the light-receiving axis direction $D_p$, similarly to the above, regardless of a change in an incident angle of the detection light L caused by predetermined expansion of the detection light emitted from the emission surface 36 to the light-receiving area. This is because the irradiation axis $A_r$ is inclined by displaying the emission surface 36 to the radial direction $D_r$ perpendicular to the light-receiving axis direction $D_p$ in a plane (plane including the radial direction $D_r$ and the light-receiving axis direction $D_p$) where the light-receiving area 33a positioned. Consequently, it is possible to prevent the reduction of accuracy in angle detection caused by the reflection of the detection light L reflected between the light-receiving area 33a of the light-receiving mechanism 33 and the scale plate 31, without providing the anti-reflection layer.

Figure 11:
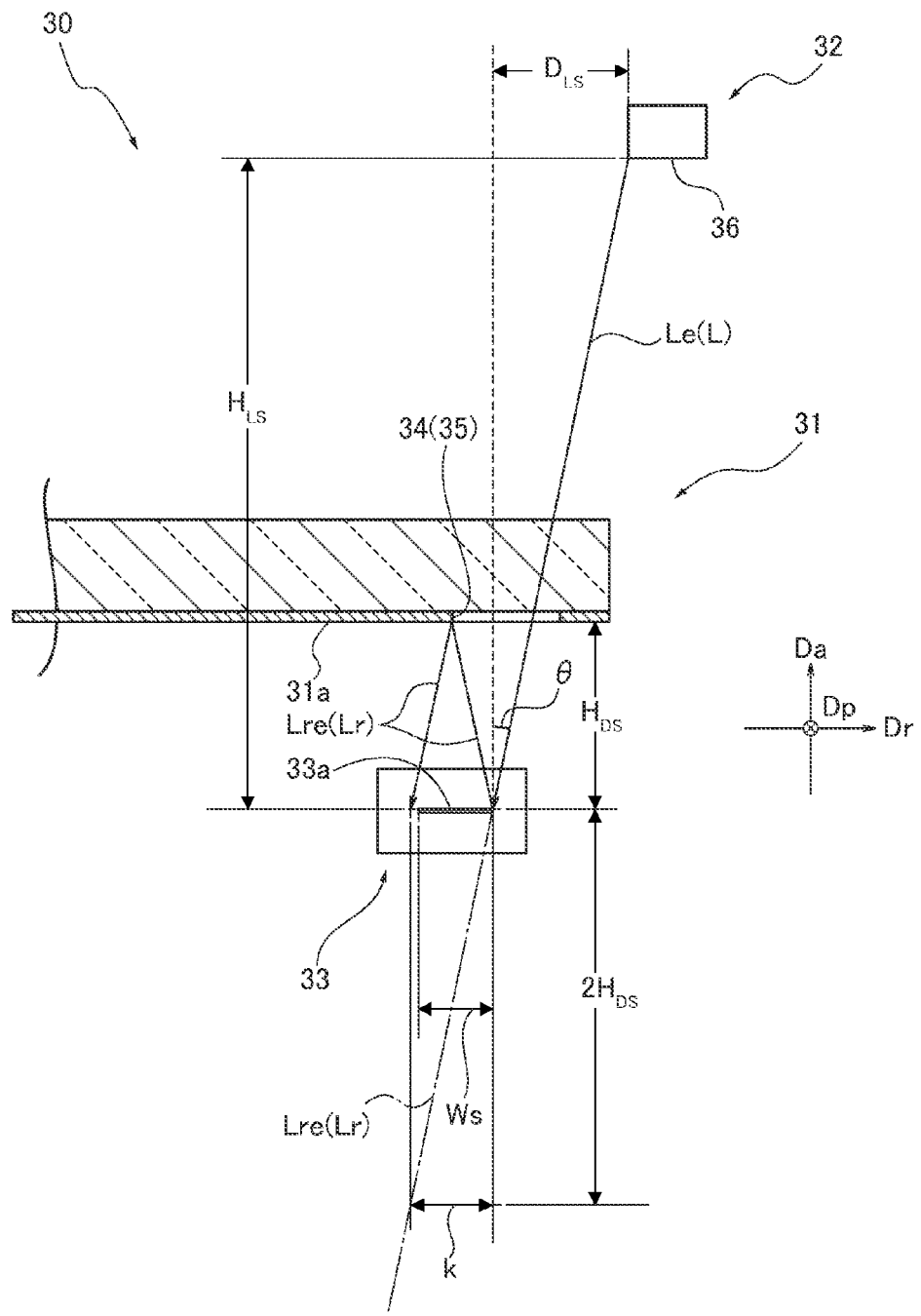
FIG. 11 is an explanatory view explaining a setting method of a degree of inclination of an irradiation axis relative to the plane including the rotation axis direction and the light-receiving axis direction.

Next, a method of setting a degree of inclination of the irradiation axis $A_r$ to the plane including the rotation axis direction $D_a$ and the light-receiving axis direction $D_p$ in each absolute encoder 30 is described with reference to FIG. 11. FIG. 11 schematically illustrates a state setting a position relationship between each scale plate 31 (scale area 35) and the light-emitting and light-receiving mechanisms 32 and 33 to facilitate understanding thereof, which does not necessarily correspond to an actual form and other drawings.

To set a degree of the inclination, inner end detection light $L_e$ and outer end reflection detection light $L_{re}$ are first defined, as shown in FIG. 11. The inner end detection light Le is light directing to an end portion (outer end position as viewed in the radial direction $D_r$) of the positive side of the radial direction $D_r$ in the light-receiving area 33a, of the detection light L emitted from an end portion (inner end position as viewed in the radial direction $D_r$) of the negative side of the radial direction $D_r$ in the emission surface 36 of the light-emitting mechanism 32. The outer end reflection detection light $L_{re}$ is the reflection detection light $L_r$ in which the inner end detection light Le is reflected on the end portion (outer end position as viewed in the radial direction $D_r$) of the positive side of the radial direction $D_r$ in the light-receiving area 33a. An inclination angle of the inner end detection light Le to the plane (plane including the rotation axis direction $D_p$ and parallel to the light-receiving axis direction $D_p$) including the rotation axis direction $D_a$ and the light-receiving axis direction $D_p$ is set as an inner end incident angle θ.

In addition to this, an interval between the end portion (inner end position as viewed in the radial direction $D_r$) of the negative side of the radial direction $D_r$ in the emission surface 36 of the light-emitting mechanism 32 as viewed in the radial direction $D_r$ and the end portion (outer end position as viewed in the radial direction $D_r$) of the positive side of the radial direction $D_r$ in the light-receiving area 33a of the light-receiving mechanism 33 is set as a radial direction distance $D_{LS}$ in the light-emitting mechanism 32 (emission surface 36) and the light-receiving mechanism 33 (light-receiving area 33a). An interval between the end portion (lower end position as viewed in the rotation axis direction $D_a$) of the negative side of the rotation axis direction $D_a$ in the emission surface 36 of the light-emitting mechanism 32 as viewed in the rotation axis direction $D_a$ and the end portion (upper end position as viewed in the rotation axis direction $D_a$) of the positive side of the rotation axis direction $D_a$ in the light-receiving area 33a of the light-receiving mechanism 33 is set as an axis direction distance $H_{LS}$ in the light-emitting mechanism 32 (emission surface 36) and the light-receiving mechanism 33 (light-receiving area 33a). Furthermore, an interval between the light-receiving area 33a of the light-receiving mechanism 33 as viewed in the rotation axis direction $D_a$ and the back surface 31a (chrome plating) of the scale plate 31, which a the reflection surface is set as an axis direction distance $H_{DS}$ in the light-receiving mechanism 33 (light-receiving area 33a) and the scale plate 31 (back surface 31a). A width dimension of the light-receiving area 33a, that is to say, a size as viewed in a direction perpendicular to the light-receiving axis direction $D_p$ in the light-receiving area 33a is set as a width dimension $W_s$ of the light-receiving area 33a. An interval between the end portion (outer end position as viewed in the radial direction $D_r$) of the positive side of the radial direction $D_r$ in the light-receiving area 33a as viewed in the radial direction $D_r$ and a position at a time when the outer end reflection detection light $L_{re}$ is reflected on the back surface 31a (chrome plating) of the scale plate 31 and reaches the plane parallel to the light-receiving area 33a is set as an incident position k of the outer end reflection detection light $L_{re}$.

In each absolute encoder 30, from the viewpoint of preventing the outer end reflection detection light $L_{re}$ reflected on the back surface 31a (chrome plating) of the scale plate 31 from reaching the light-receiving area 33a, the degree of inclination of the irradiation axis $A_r$ relative to the plane including the rotation axis direction $D_a$ and the light-receiving axis direction $D_p$ is set. This is because the outer end reflection detection light $L_{re}$ is defined as described above, and if the outer end reflection detection light $L_{re}$ does not reach the light-receiving area 33a, all the reflection detection light $L_r$ reflected on the back surface 31 (chrome plating) of the scale plate 31 can be prevented from reaching the light-receiving area 33a, regardless of the reflected position and the travelling direction of the outer end reflection detection light.

From the conditions as described above, the following expression is obtained.

$$(D_{LS}/H_{LS})=k/(2\times H_{DS})$$

Not to let arrive the outer end reflection detection light $L_{re}$ at the light-receiving area 33a, because it is necessary to satisfy $k>W_s$, the following condition may be satisfied.

$$W_s<k=\{(2\times D_{LS}\times H_{DS})/H_{LS}\}$$

Thus, the inner end incident angle θ is as follows.

$$\theta=\tan^{-1}(D_{LS}/H_{LS})$$

Therefore, it is possible to securely prevent the outer end reflection detection light $L_{re}$ from reaching the light-receiving area 33a by setting the position relationship between the light-emitting mechanism 32 and the light-receiving mechanism 33 relative to the inner end incident angle θ and the scale plate 31 (scale area 35) to satisfy the above conditions, in each absolute encored 30. Therefore, in each absolute encoder 30, even if the detection light L is reflected (reflection detection light $L_r$) on the light-receiving area 33a of the light-receiving mechanism 33 and the reflection detection light $L_r$ is reflected again on the back surface 31a (chrome plating) of the scale plate 31, the reflection detection light $L_r$ can be prevented from reaching the light-receiving area 33a, regardless of the reflected position and the travelling direction of the reflection detection light $L_r$.

In this way, in each of the absolute encoders 30 as one embodiment, the position relationship between the light-emitting mechanism 32 and the light-receiving mechanism 33 is set such that the irradiation axis $A_r$ is inclined relative to the rotation axis direction $D_a$. Therefore, even if the reflection detection light $L_r$ reflected on the light-receiving area 33a is reflected again on the back surface 31a (chrome plating) of the scale plate 31, the reflection detection light $L_r$ can be prevented from reaching the light-receiving area 33a.

Because only the position relationship between the light-emitting mechanism 32 and the light-receiving mechanism 33 is set so as to incline the irradiation axis $A_r$ relative to the rotation axis direction $D_a$, it is possible to reduce the number of manufacturing steps and eliminate excessive parts, compared with providing the anti-reflection film on the scale plate 31, without generating the increment in number of manufacturing steps and excessive parts. As a result, the reflection detection light $L_r$ can be prevented from reaching the light-receiving area 33 without increasing the manufacturing cost.

Furthermore, the position relationship between relationship is set such that the light-receiving mechanism 33 has the light-receiving area 33a extending linearly in the light-receiving axis direction $D_p$ and the irradiation axis $A_r$ is inclined relative to the plane (plane including the rotation axis direction and parallel to the light-receiving axis direction $D_p$) including the rotation axis direction da and the light-receiving axis direction $D_p$. Therefore, because the reflection detection light $L_r$ reflected on the scale plate 31 (back surface 31a) can be traveled to the portion other than the light-receiving area 33a by directing to the direction perpendicular to the light-receiving axis direction $D_p$, it is possible to prevent securely the reflection detection light $L_r$ from reaching the light-receiving area 33a, while reducing the degree of inclination of the irradiation axis $A_r$. This is for the reason in that it is necessary to largely incline the irradiation axis according to a length dimension of the light-receiving area 33a in the light-receiving axis direction $D_p$, because the light-receiving area 33a linearly extends in the light-receiving axis direction $D_p$, when directing the reflection detection light $L_r$ reflected on the scale plate 31 (back surface 31a) in the light-receiving axis direction $D_p$.

In each absolute encoder 30, the light-receiving mechanism 33 is provided to position the light-receiving axis direction $D_p$ in the direction parallel to the chord of the disc-like shape with respect to the scale plate 31 of the disc-like shape. Therefore, because the reflection detection light $L_r$ reflected on the scale plate 31 (back surface 31a) can be directed to the portion other than the light-receiving area 33a in the radial direction $D_r$, the reflection detection light $L_r$ can be securely prevented from reaching the light-receiving area 33a while reducing the degree of inclination of the irradiation axis $A_r$ relative to the plane including the rotation axis direction $D_a$ and the light-receiving direction $D_p$. In addition, it is possible to prevent each absolute encoder 30 from extending influence to the angle detection, even if the irradiation axis $A_r$ is inclined, because the form of each slit of the scale plate 31 is required to detect the rotation position of the disc-shaped scale plate 31.

The irradiation axis $A_r$ is inclined relative to the plane including the rotation axis direction $D_a$ and the light-receiving axis direction $D_p$ by positioning the light-emitting mechanism 32 (emission surface 36) in the positive side (outer side as viewed in the radial direction $D_r$) of the radial direction $D_r$ than the light-receiving mechanism 33 (light-receiving area 33a). Therefore, it is possible to securely prevent the reflection detection light $L_r$ from reaching the light-receiving area 33a with a simple configuration.

Even if the outer end reflection detection light $L_{re}$ in which the inner end detection light $L_e$ is reflected on the outer end position as viewed in radial direction $D_r$ in the light-receiving area 33a is reflected again on the scale plate 31, the position relationship between the light-emitting mechanism 32 and the light-receiving mechanism 33 is set by setting the inner end incident angle θ so as to prevent the outer end reflection detection light from reaching the light-receiving area 33a. Therefore, even if the detection light L is reflected (reflection detection light $L_r$) on the light-receiving area 33a of the light-receiving mechanism 33 and the reflection detection light $L_r$ is reflected again on the back surface 31a (chrome plating) of the scale plate 31, the reflection detection light $L_r$ can be securely prevented from reaching the light-receiving area 33a, regardless of the position and the traveling direction of reflection of the reflection detection light $L_r$.

The degree of inclination of the irradiation axis $A_r$ relative to the plane including the rotation axis direction $D_a$ and the light-receiving axis direction $D_p$ is set base on the position of the emission surface 36 of the light-emitting mechanism 32, and width dimension $W_s$ and the position of the light-receiving area 33a of the light-receiving mechanism 33. Therefore, in each absolute encoder 30, because the degree of inclination of the irradiation axis $A_r$ is set based on the portion where the detection light L is emitted and the portion where the reflection detection light $L_r$ does not want to reach, the reflection detection light $L_r$ can be securely prevented from reaching the light-receiving area 33a.

Because the position relationship between the light-emitting mechanism 32 and the light-receiving mechanism 33 is set so as to incline the irradiation axis $A_r$ relative to the rotation axis direction $D_a$, the light-emitting mechanism 32 and the light-receiving mechanism 33 (detection mechanism) which make the pair make it possible to prevent the provision of plural of sets of light-emitting and light-receiving mechanisms at positions in a rotational symmetry of the scale plate with respect to a rotation center of the scale plate 31 from being complicated. Therefore, in each absolute encoder 30, it is possible to further suitably detect the angle of the surveying device.

In the surveying device 10, because the absolute encoders 30 are installed, the foregoing advantageous effects can be acquired. In addition, the measurement of direction by the surveying unit can be suitably accomplished.

Accordingly, in the absolute encoders 30 as one embodiment of the present invention, it is possible to prevent the accuracy in angle detection caused by reflection of the detection light L between the light-receiving area 33a and the scale plate 31 from reducing, while suppressing an increase in manufacturing costs.

Embodiment 2

Figure 12:
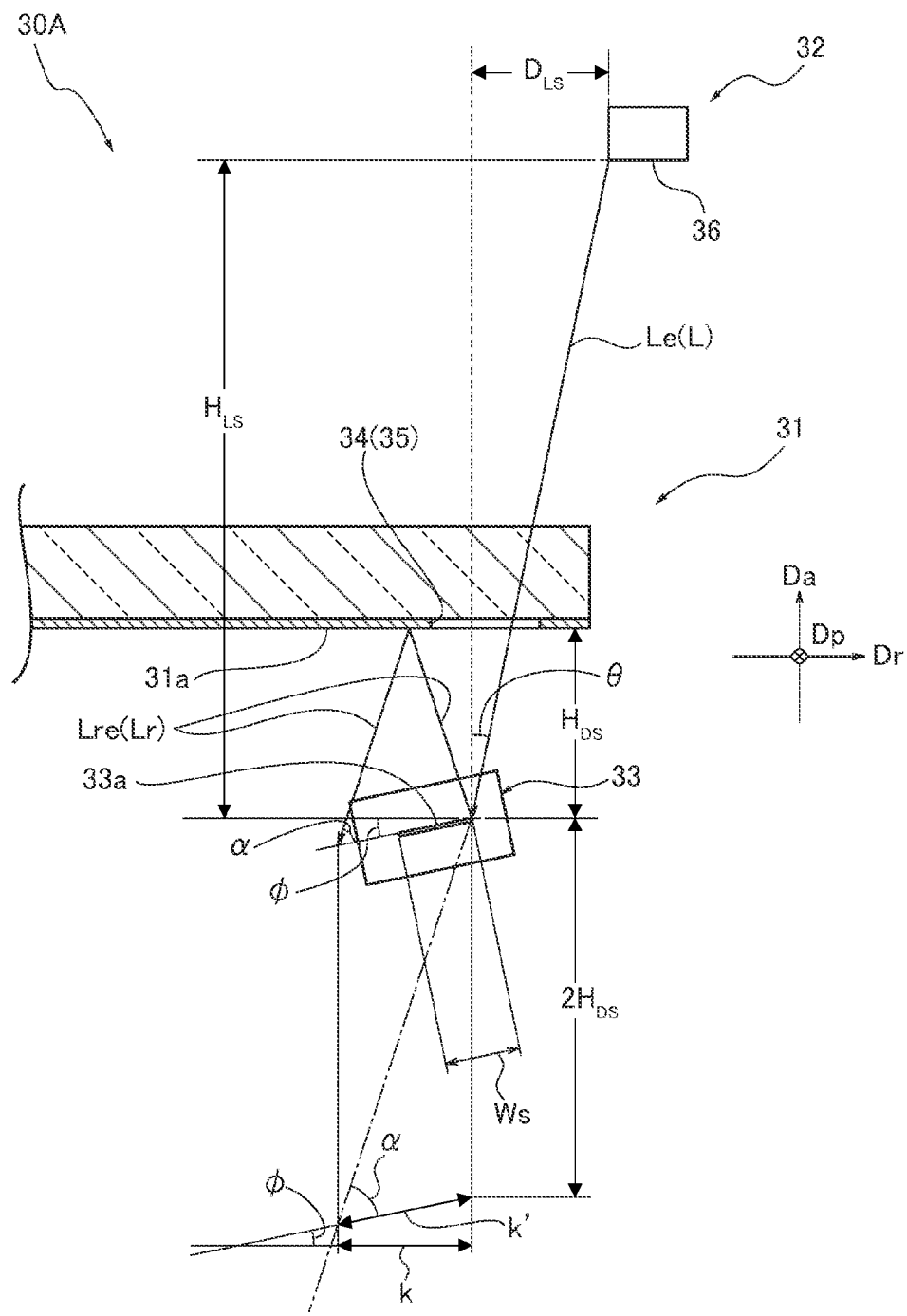
FIG. 12 is an explanatory view similar to FIG. 11, explaining a setting method of a degree of inclination of an irradiation axis relative to the plane including the rotation axis direction and the light-receiving axis direction, in an absolute encoder in the second embodiment.

Next, an absolute encoder 30A and a surveying device 10 on which the absolute encoder 30A is installed in a second embodiment of the present invention are described with reference to FIG. 12. FIG. 12 schematically shows a state setting a position relationship between the light-emitting mechanism 32 and the light-receiving mechanism 33 relative to the scale plate 31 (scale area 35) to facilitate understanding of the state, which does not necessarily correspond to an actual form and other drawings.

The absolute encoder 30A in the second embodiment is an example setting the degree of inclination of the irradiation axis $A_r$ relative to the plane including the rotation axis direction $D_a$ and the light-receiving axis direction $D_p$ in consideration of a case where the light-receiving mechanism 33 is provided in an inclined state. The absolute encoder 30A in the second embodiment has the same basic configuration as that in the absolute encoder 30 in the first embodiment as described above. Therefore, identical reference numbers are attached to similar parts, a detailed description thereof is omitted. In addition, the surveying device 10 in the second embodiment is the same as that in the first embodiment except for the installation of the absolute encoder 30A. Therefore, FIG. 1 is used and a detailed description thereof is omitted.

To set the degree of inclination of the irradiation axis $A_r$, the inclined angle of the light-receiving mechanism 33 (light-receiving area 33a) relative to the scale plate 31, that is to say, the inclined angle of the light-receiving mechanism 33 (light-receiving area 33a) relative to the radial direction $D_r$ which is a direction where the scale plate 31 extends is first set as a light-receiving inclination angle φ. Moreover, after the detection light is reflected on the light-receiving area 33a relative to the direction where the light-receiving mechanism 33 (light-receiving area 33a) extends, an angle where the outer end reflection detection light $L_{re}$ reflected on the back surface 31a (chrome plating) of the scale plate 31 makes is set as a reflection-light inclination angle α. An interval between the end portion (outer end position as viewed in the radial direction $D_r$) of the positive side of the radial direction $D_r$ in the light-receiving area 33a as viewed in the direction where the light-receiving mechanism 33 (light-receiving area 33a) extends and the position when the outer end reflection detection light $L_{re}$ is reflected on the back surface 31a (chrome plating) of the scale plate 31 and reaches the plane extending from the inner end position of the light-receiving area 33a to the inner side in the radial direction $D_r$ is set as an incident position k' of the outer end reflection detection light $L_{re}$. In addition, an interval at the incident position k' as viewed in the radial direction $D_r$ is set as an incident position k. Here, because the light-receiving mechanism 33 (light-receiving area 33a) is inclined, an interval between the outer end position of the light-receiving area 33a and the back surface 31a (chrome plating) of the scale plate 31, as viewed in the rotation axis direction da is set as the axis direction distance $H_{ds}$.

The inner end incident angle θ can be shown similarly to the first embodiment as follows.

$$\theta = \tan^{-1}(D_{LS}/H_{LS})$$

Thus, the incident angle k' and the incident angle k are set and the following condition is set.

$$\{k'/\sin(\theta + 2\phi)\} = \{(2 \times H_{DS})/\sin\alpha\}$$
$$= \{(2 \times H_{DS})/\sin(90° - \theta - 3\phi)\}$$
$$= \{(2 \times H_{DS})/\cos(\theta + 3\phi)\}$$
$$k' = 2 \times H_{DS} \times \{\sin(\theta + 2\phi)/\cos(\theta + 3\phi)\}$$
$$W_s < k' = 2 \times H_{DS} \times \{\sin(\theta + 2\phi)/\cos(\theta + 3\phi)\}$$

Therefore, in the absolute encoder 30A, the outer end reflection detection light $L_{re}$ can be securely prevented from reaching the light-receiving area 33a by setting the position relationship between the light-emitting mechanism 32 and the light-receiving mechanism 33 relative to the inner end incident angle θ and the scale plate 31 (scale area 35) to satisfy the above condition. As a result, even if the detection light 1 is reflected on the light-receiving area 33a of the light-receiving mechanism 33 (reflection detection light $L_r$) and the reflection detection light $L_r$ is reflected again on the back surface 31a (chrome plating) of the scale plate 31, it is possible to securely prevent the reflection detection light $L_r$ from reaching the light-receiving area 33a regardless of the position and the travelling direction of the reflection of the reflection detection light $L_r$.

The absolute encoder 30A in the second embodiment has the same configuration as the absolute encoder 30 in the first embodiment. Accordingly, basically, advantageous effects similar to that in the first embodiment can be acquired.

In addition to that, in the absolute encoder 30A in the second embodiment, the degree of inclination of the irradiation axis $A_r$ relative to the plane including the rotation axis direction $D_a$ and the light-receiving axis direction $D_p$ is set assuming a case where the light-receiving mechanism 33 (light-receiving area 33a) is provided to be inclined by the light-receiving inclination angle φ relative to the direction (existing direction) where the scale plate 31 extends. Therefore, the reflection detection light $L_r$ can be prevented from reaching the light-receiving area 33a without strictly controlling the accuracy in the manufacturing process by setting the light-receiving inclination angle φ in consideration of assembling tolerance or manufacturing tolerance in the light-receiving mechanism 33 (light-receiving area 33a), for example. Consequently, it is possible to prevent the reflection detection light $L_r$ from reaching the light-receiving area 33a while suppressing the increase in the manufacturing cost.

Because the absolute encoder 30A is installed on the surveying device 10 (see FIG. 1), it is possible to acquire the advantageous effects described above and execute suitably the measurement of the direction by the surveying unit.

Accordingly, in the absolute encoder 30A according to the second embodiment, it is possible to prevent the accuracy in the angle detection caused by the reflection of the detection light L between the light-receiving area 33a and the scale plate 31 from reducing while suppressing the increase in the manufacturing cost.

Note that, in the second embodiment, the light-receiving mechanism 33 (light-receiving area 33a) is configured to be inclined. However, the light-receiving mechanism 33 (light-receiving area 33a) may be inclined in absolute encoders 30B to 30F in third to seventh embodiments described below, and is not limited to the configuration of the second embodiment.

Embodiment 3

Figure 13:
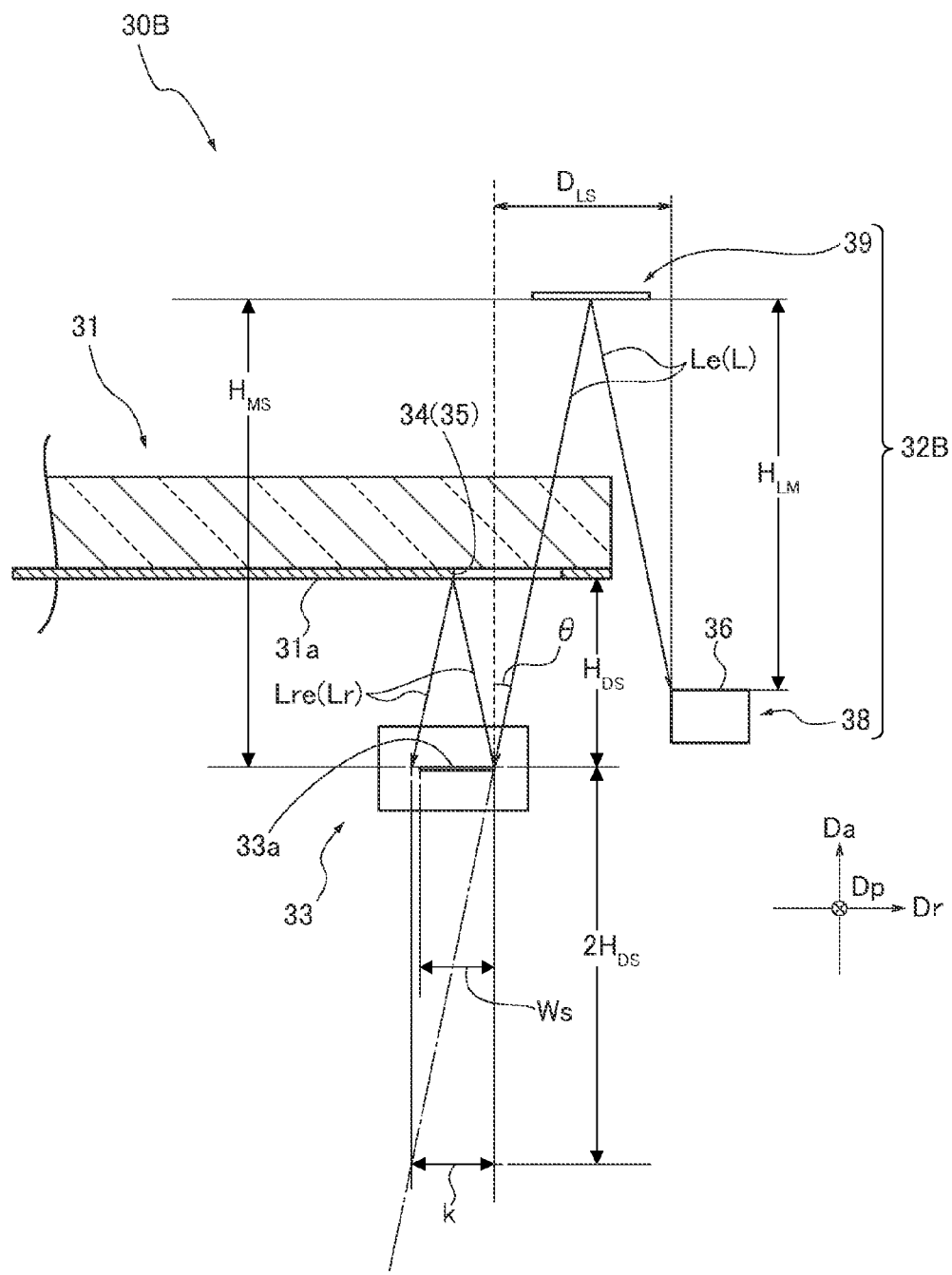
FIG. 13 is an explanatory view similar to FIG. 11, explaining a setting method of a degree of inclination of an irradiation axis relative to the plane including the rotation axis direction and the light-receiving axis direction, in an absolute encoder in the third embodiment.

Next, the absolute encoder 30B in the third embodiment and a surveying device 10 on which the absolute encoder 30B is installed are described with reference to FIG. 13. FIG. 13 schematically shows a state setting a position relationship between the light-emitting mechanism 32 and the light-receiving mechanism 33 relative to the scale plate 31 (scale area 35) to facilitate understanding of the state, which does not necessarily correspond to an actual form and other drawings.

The absolute encoder 30B in the third embodiment is an example in which a light-emitting mechanism 32B has a configuration different from that of the absolute encoder 30 in the first embodiment. A basic configuration of the absolute encoder 30B in the third embodiment is the same as that of the absolute encoder 30 in the first embodiment. Therefore, identical reference numbers are attached to similar parts and a detailed description thereof is omitted. The surveying device 10 in the third embodiment is the same as that in the first embodiment except for installation of the absolute encoder 30B in the third embodiment. Therefore, FIG. 1 is used and a detailed description is omitted.

A configuration of the light-emitting mechanism 32B in the absolute encoder 30B is first described. The light-emitting mechanism 32B has a light-emitting part 38 and a reflection part 39, as shown in FIG. 13. The light-emitting part 38 emits the detection light L to the reflection part 39 to emit the detection light L toward the scale area 35 in the scale plate 31. A light-emitting surface (light emission surface) functions as the emission surface 36 that emits the detection light L in the light-emitting mechanism 32B. The light-emitting part 38 is configured by a light-emitting diode in the third embodiment.

The reflection part 39 reflects the detection light L emitted from the light-emitting part 38 (emission surface 36) toward the scale area 35 of the scale plate 31. The reflection part 39 is configured by a flat plate-shaped mirror in the third embodiment. The light-emitting mechanism 32B emits the detection light L from the light-emitting part 38 (emission surface 36). The detection light L is reflected on the reflection part 39 (reflection surface) to irradiate the scale area 35 of the scale plate 31 with the detection light L.

Next, a degree of inclination of the irradiation axis $A_r$ relative to the plane including the rotation axis direction $D_a$ and the light-receiving axis direction $D_p$ in the absolute encoder 30B is described. In the absolute encoder 30B, because the light-emitting mechanism 32B is configured by the light-emitting part 38 and the reflection part 39, an axis direction distance $H_{MS}$ and an axis direction distance $H_{LM}$ are used, instead of the axis direction distance $H_{LS}$ (see FIG. 11). The axis direction distance $H_{MS}$ shows an interval between an end portion (lower end position as viewed in the rotation axis direction $D_a$) of a negative side of the rotation axis direction $D_a$ in the reflection part 39 as viewed in the rotation axis direction $D_a$ and an end portion (upper end position as viewed in the rotation axis direction $D_a$) of a positive side of the rotation axis direction $D_a$ in the light-receiving area 33a of the light-receiving mechanism 33. Moreover, the axis direction distance $H_{MS}$ shows an interval between an end portion (lower end position as viewed in the rotation axis direction $D_a$) of a negative side of the rotation axis direction $D_a$ in the reflection part 39 as viewed in the rotation axis direction $D_a$ and an end portion (upper end position as viewed in the rotation axis direction $D_a$) of a positive side of the rotation axis direction $D_a$ in the emission surface 36 of the light-emitting part 38.

The inner end incident angle θ as follows.

$$\theta = \tan^{-1}[D_{LS}/(H_{LM}+H_{MS})]$$

Thus, the incident position k is set as follows and the following conditions are set.

$$D_{LS}/(H_{LM}+H_{MS}) = k/(2 \times H_{DS})$$

$$W_s < k = (2 \times D_{LS} \times H_{DS})/(H_{LM}+H_{MS})$$

Therefore, in the absolute encoder 30B, the outer end reflection detection light $L_{re}$ can be securely prevented from reaching the light-receiving area 33a by setting a position relationship between the light-emitting mechanism 32B (light-emitting part 38 and the reflection part 39) and the light-receiving mechanism 33 relative to the inner end incident angle θ and the scale plate 31 (scale area 35) to satisfy the conditions as described above. Therefore, in the absolute encoder 30B, even if the detection light L is reflected on the light-receiving area 33a of the light-receiving mechanism 33 (reflection detection light $L_r$) and the reflection detection light $L_r$ is reflected again on the back surface 31a (chrome plating) of the scale plate 31, the reflection detection light $L_r$ can be securely prevented from reaching the light-receiving area 33a regardless of the reflection position and the travelling direction of the reflection detection light $L_r$.

Because the absolute encoder 30B in the third embodiment basically has the same configuration as the absolute encoder 30 in the first embodiment, it is possible to acquire the same advantageous effects as that in the first embodiment, basically.

In addition to that, in the absolute encoder 30B in the third embodiment, the light-emitting mechanism 32B is configured to emit the detection light L from the light-emitting part 38 (emission surface 36), reflect the detection light on the reflection part 39 and irradiate the scale area 35 of the scale plate 31 with the detection light L. Even if the light-emitting mechanism 32B is configured in such a way, with a simple configuration, the reflection detection light $L_r$ can be prevented from reaching the light-receiving area 33a.

In addition, in the absolute encoder 30B, the irradiation axis $A_r$ is inclined relative to the plane including the rotation axis direction $D_a$ and the light-receiving axis direction $D_p$ by positioning the light-emitting mechanism 32B on the positive side (outer side as viewed in the radial direction $D_r$) of the radial direction $D_r$ than the light-receiving mechanism 33. Therefore, in the absolute encoder 30B, the configuration in that the scale area 35 of the scale plate 31 is irradiated with the detection light L is facilitated and the reflection detection light $L_r$ can securely be prevented from reaching the light-receiving area 33a by emitting the detection light L from the light-emitting part 38 (emission surface 36) of the light-emitting mechanism 32b and reflecting it on the reflection part 39. This is because, if the light-emitting mechanism 32B is positioned on the negative side (inner side as viewed in the radial direction $D_r$) of the radial direction $D_r$ than the light-receiving mechanism 33, it is necessary to have a configuration to secure the setting position of the light-emitting part 38 or the optical path of the detection light L to travel the detection light L emitted from the light-emitting part 38 (emission surface 36) to the reflection part 39.

Furthermore, in the absolute encoder 30B, the scale area 35 of the scale plate 31 is configured to be irradiated with the detection light L by configuring the light-emitting mechanism 32B to emit the detection light L from the light-emitting part 38 and reflect it on the reflection part 39. Therefore, the light-emitting part 38 and the light-receiving mechanism 33 can be arranged on the negative side of the rotation axis direction $D_a$ relative to the scale plate 31. Thereby, the control mechanism 37 (see FIG. 2) to control the light-emitting part 38 and the light-receiving mechanism 33 also can be arranged on the negative side of the rotation axis direction $D_a$ relative to the scale plate 31. As a result, it is possible to use short connection lines that connect the light-emitting part 38 or the light-receiving mechanism 33 and the control mechanism 37 and suppress largely a space handling the connections. In addition, the size of the light-emitting mechanism 32B as viewed in the rotation axis direction Da can be configured to be small. Consequently, it is possible to reduce the number of parts, easily accomplish a miniaturization and realize a simple configuration of the absolute encoder 30B, and securely prevent the reflection detection light L from reaching the light-receiving area 33a.

In the absolute encoder 30B, because the light-emitting part 38 of the light-emitting mechanism 32B and the light-receiving mechanism 33 can be arranged on the negative side of the rotation axis direction $D_a$ relative to the scale plate 31, it is possible to easily provide the light-emitting part 38 and the light-receiving mechanism 33 on the same substrate. Therefore, the absolute encoder 30B is configured to be capable of reducing the number of parts and securely preventing the reflection detection light $L_r$ from reaching the light-receiving area 33a with a simple configuration.

Because the absolute encoder 30B is installed on the surveying device 10 (see FIG. 1), the surveying device can acquire the foregoing advantageous effects and more appropriately perform the measurement of the direction by the surveying unit.

Accordingly, in the absolute encoder 30B in the third embodiment, it is possible to suppress the increase in the manufacturing cost and prevent the accuracy in the angle detection caused by the reflection of the detection light L between the light-receiving area 33a and the scale plate 31 from reducing.

Embodiment 4

Figure 14:
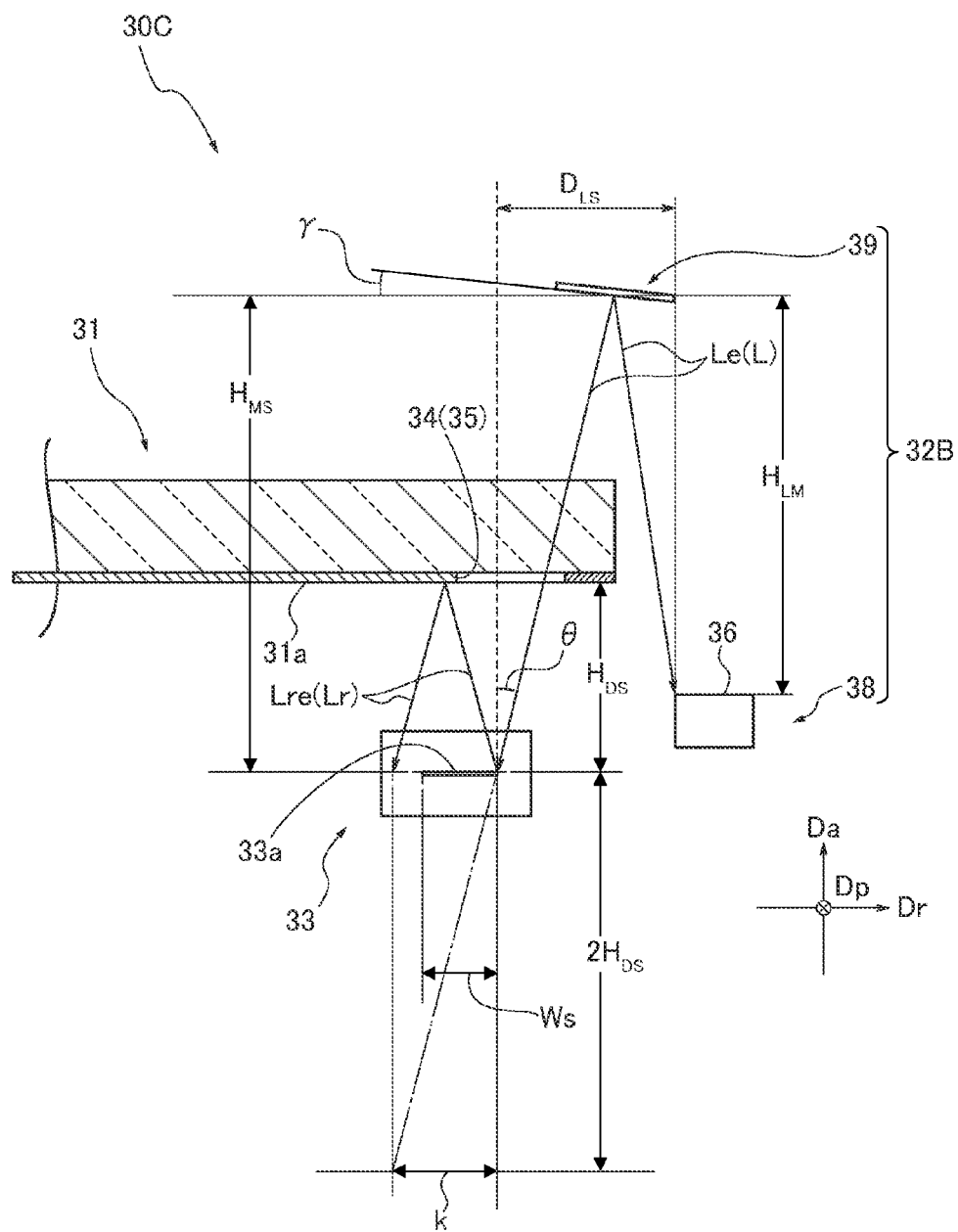
FIG. 14 is an explanatory view similar to FIG. 11, explaining a setting method of a degree of inclination of an irradiation axis relative to the plane including the rotation axis direction and the light-receiving axis direction, in an absolute encoder in the fourth embodiment.

Next, an absolute encoder 30C according to a fourth embodiment of the present invention and a surveying device 10 installing the absolute encoder 30C thereon are described with reference to FIG. 14. FIG. 14 schematically shows a state setting a position relationship between the light-emitting mechanism 32B and the light-receiving mechanism 33 relative to the scale plate 31 (scale area 35) to facilitate understanding of the state, which does not necessarily correspond to an actual form and other drawings.

The absolute encoder 30C in the fourth embodiment is an example that sets a degree of inclination of the irradiation axis $A_r$ relative to the plane including the rotation axis direction $D_a$ and the light-receiving axis direction $D_p$ in consideration of a case where the reflection part 39 of the light-emitting mechanism 32B is provided to be inclined. A basic configuration of the absolute encoder 30C in the fourth embodiment is the same as that of the absolute encoder 30B in the third embodiment. Therefore, identical reference numbers are attached to similar parts and a detailed description thereof is omitted. The surveying device 10 in the fourth embodiment is the same as that in the first embodiment except for the installation of the absolute encoder 30C in the fourth embodiment. Therefore, FIG. 1 is used and a detailed description is omitted.

To set the degree of inclination, the inclination angle of the reflection part 39 relative to a radial direction $D_r$ which is the direction (existing direction) where the scale plate 31 extends is first set as a reflection inclination angle γ, as shown in FIG. 14.

The inner end incident angle θ and the incident position k are set as follows and the following conditions are set.

$H_{LM} \times \tan\theta + H_{MS} \times \tan(\theta+2\gamma) = D_{LS}$ $H_{LM} \times \tan\theta + H_{MS} \times [(\tan\theta + \tan 2\gamma)/\{1-(\tan\theta \times \tan 2\gamma)\}] = D_{LS}$ $H_{LM} \times \tan^2\theta - (D_{LS} \times \tan 2\gamma + H_{LM} + H_{MS}) \times \tan\theta + H_{MS} \times \tan 2\gamma - D_{LS} = 0$ Where, $a = H_{LM}$,
$b = D_{LS} \times \tan 2\gamma + H_{LM} + H_{MS}$,
$c = H_{MS} \times \tan 2\gamma - D_{LS}$ Accordingly, the above expressions can be shown as follows.

$\tan\theta = \{b + (b^2 - 4 \times a \times c)^{1/2}\}/(2 \times a)$

However, $H_{ms} \times \tan 2\gamma < D_{LS}$
Whereby, $k = 2 \times H_{DS} \times \tan(\theta + 2\gamma)$
$W_s < k = 2 \times H_{DS} \times \tan(\theta + 2\gamma)$ Therefore, in the absolute encoder 30C, the outer end reflection detection light $L_{re}$ can be securely prevented from reaching the light-receiving area 33a by setting the position relationship between the light-emitting mechanism 32B (light-emitting part 38 and the reflection part 39) and the light-receiving mechanism 33 relative to the inner end incident angle θ and the scale plate 31 (scale area 35) to satisfy the conditions as described above. In the absolute encoder 30C, even if the detection light L is reflected on the light-receiving area 33a of the light-receiving mechanism 33 (reflection detection light $L_r$) and the reflection detection light $L_r$ is reflected again on the back surface 31a (chrome plating) of the scale plate 31, the reflection detection light $L_r$ can be securely prevented from reaching the light-receiving area 33a regardless of the reflection position and the travelling direction of the reflection detection light $L_r$.

The absolute encoder 30C in the fourth embodiment has the same configuration as that of the absolute encoder 30B in the third embodiment basically. Therefore, the same advantageous effects as that of the third embodiment can be basically acquired.

In addition to that, in the absolute encoder 30C in the fourth embodiment, the degree of inclination of the irradiation axis $A_r$ relative to the plane including the rotation axis direction $D_a$ and the light-receiving axis direction $D_p$ is set, assuming a case where the reflection part 39 of the light-emitting mechanism 32B is inclined by the reflection inclination angle γ relative to the direction where the scale plate 31 extends. Therefore, in the absolute encoder 30C, the reflection detection light $L_r$ can be prevented from reaching the light-receiving area 33a without severing controlling the accuracy in the manufacturing process by setting the reflection inclination angle γ in consideration of the assembling tolerance or the manufacturing tolerance of the reflection part 39, for example. Thereby, in the absolute encoder 30C, it is possible to further securely suppress the increase in the manufacturing cost and prevent the reflection detection light $L_r$ from reaching the light-receiving area 33a.

Because the absolute encoder 30C is installed on the surveying device 10 (see FIG. 1), the advantageous effects as described above can be acquired and the measurement of the direction by the surveying unit can be more appropriately executed.

Accordingly, in the absolute encoder 30C according to the fourth embodiment, it is possible to suppress the increase in the manufacturing cost and prevent the accuracy in the angle detection caused by the reflection of the detection light L between the light-receiving area 33a and the scale plate 31 from reducing.

Embodiment 5

Figure 15:
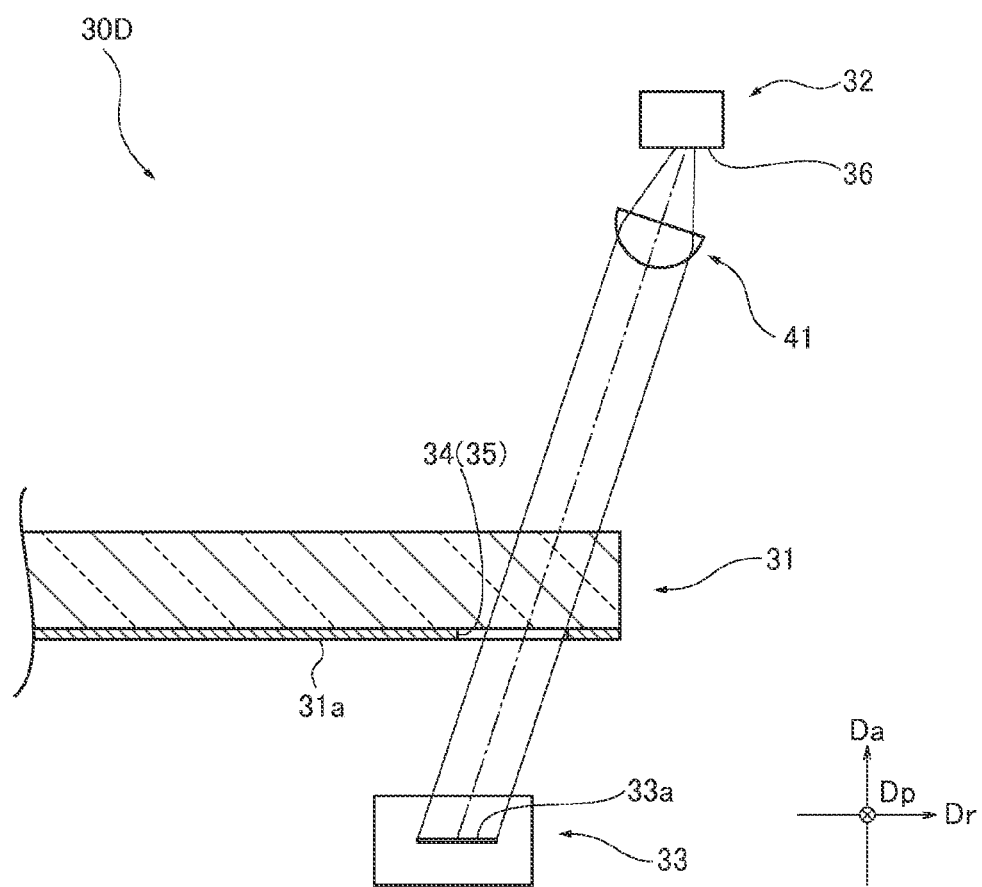
FIG. 15 is an explanatory view explaining a configuration of an absolute encoder in a fifth embodiment.

Next, an absolute encoder 30D according to a fifth embodiment of the present invention and a surveying device 10 installing the absolute encoder 30D thereon are described with reference to FIG. 15. FIG. 15 schematically shows a configuration of the absolute encoder 30D to facilitate understanding thereof, which does not necessarily correspond to an actual form and other drawings.

The absolute encoder 30D in the fifth embodiment is an example in which a collimating lens 41 is provided between the light-emitting mechanism 32 (emission surface 36) and the scale plate 31 (scale area 35). A configuration of the absolute encoder 30D in the fifth embodiment is basically the same as that of the absolute encoder 30 in the first embodiment described above. Therefore, identical reference numbers are attached to similar parts and a detailed description thereof is omitted. The surveying device 10 in the fifth embodiment is the same as that in the first embodiment except for the installation of the absolute encoder 30D in the fifth embodiment. Therefore, FIG. 1 is used and a detailed description is omitted.

In the absolute encoder 30D, the collimating lens 41 is provided between the emission surface 35 of the light-emitting mechanism 32 and the scale area 35 of the scale plate 31, as shown in FIG. 15. The collimating lens 41 is configured to form the detection light L emitted from the light-emitting mechanism 32 (emission surface 36) in parallel light and irradiate the scale area 35 (each slit 34) of the scale plate 31 with the parallel light. Therefore, the collimating lens 41 functions as a collimating optical mechanism.

In the absolute encoder 30D, a degree of inclination of the irradiation axis $A_r$ relative to the plane including the rotation axis direction $D_a$ and the light-receiving axis direction $D_p$ is set similarly to the first embodiment. That is to say, in the absolute encoder 30D, the collimating lens 41 as the collimating optical mechanism is provided between the light-emitting mechanism 32 and the light-receiving mechanism 33 (detection mechanism) in the absolute encoder 30 of the first embodiment.

Therefore, the outer end reflection detection light $L_{re}$ can be securely prevented from reaching the light-receiving area 33a by setting the position relationship between the light-emitting mechanism 32 and the light-receiving mechanism 33 relative to the inner end incident angle θ and the scale plate 31 (scale area 35), similarly to the first embodiment. As a result, in the absolute encoder 30D, even if the detection light L is reflected on the light-receiving area 33a of the light-receiving mechanism 33 (reflection detection light $L_r$) and the reflection detection light $L_r$ is reflected again on the back surface 31a (chrome plating) of the scale plate 31, the reflection detection light $L_r$ can be securely prevented from reaching the light-receiving area 33a regardless of the reflection position and the travelling direction of the reflection detection light $L_r$.

The absolute encoder 30D in the fifth embodiment has the same configuration as that of the absolute encoder 30 in the first embodiment basically. Therefore, the same advantageous effects as that of the first embodiment can be basically acquired.

In addition to that, in the absolute encoder 30D in the fifth embodiment, it is possible to arrive evenly the detection light L at the light-receiving area 33a, regardless of the position of the light-receiving area 33a of the light-receiving mechanism 33, extending in the light-receiving axis direction $D_p$. Therefore, in the absolute encoder 30D, it is possible to further easily execute the angle detection and prevent the reflection detection light $L_r$ from reaching the light-receiving area 33a.

Because the absolute encoder 30D is installed on the surveying device 10 (see FIG. 1), the advantageous effects as described above can be acquired and the measurement of the direction by the surveying unit can be more appropriately executed.

Accordingly, in the absolute encoder 30D according to the fifth embodiment, it is possible to suppress the increase in the manufacturing cost and prevent the accuracy in the angle detection caused by the reflection of the detection light L between the light-receiving area 33a and the scale plate 31 from reducing.

Meanwhile, the fifth embodiment shows the absolute encoder 30D in which the collimating lens 41 as the collimating optical mechanism is provided between the light-emitting mechanism 32 and the light-receiving mechanism 33 (detection mechanism) in the absolute encoder 30 of the first embodiment. However, if the collimating optical mechanism (emission surface 36) is preferably provided between the emission surface 36 and the scale plate 31 so as to irradiate the scale area 35 (each slit 34) of the scale plate 31 with the parallel light of the detection light L emitted from the light-emitting mechanism 32 (emission surface 36), the collimating optical mechanism (collimating lens 41) may be provided on each of the absolute encoders 30A, 30B and 30C in the second to fourth embodiments. Therefore, the absolute encoder is not limited to the configuration of the fifth embodiment.

Embodiment 6

Figure 16:
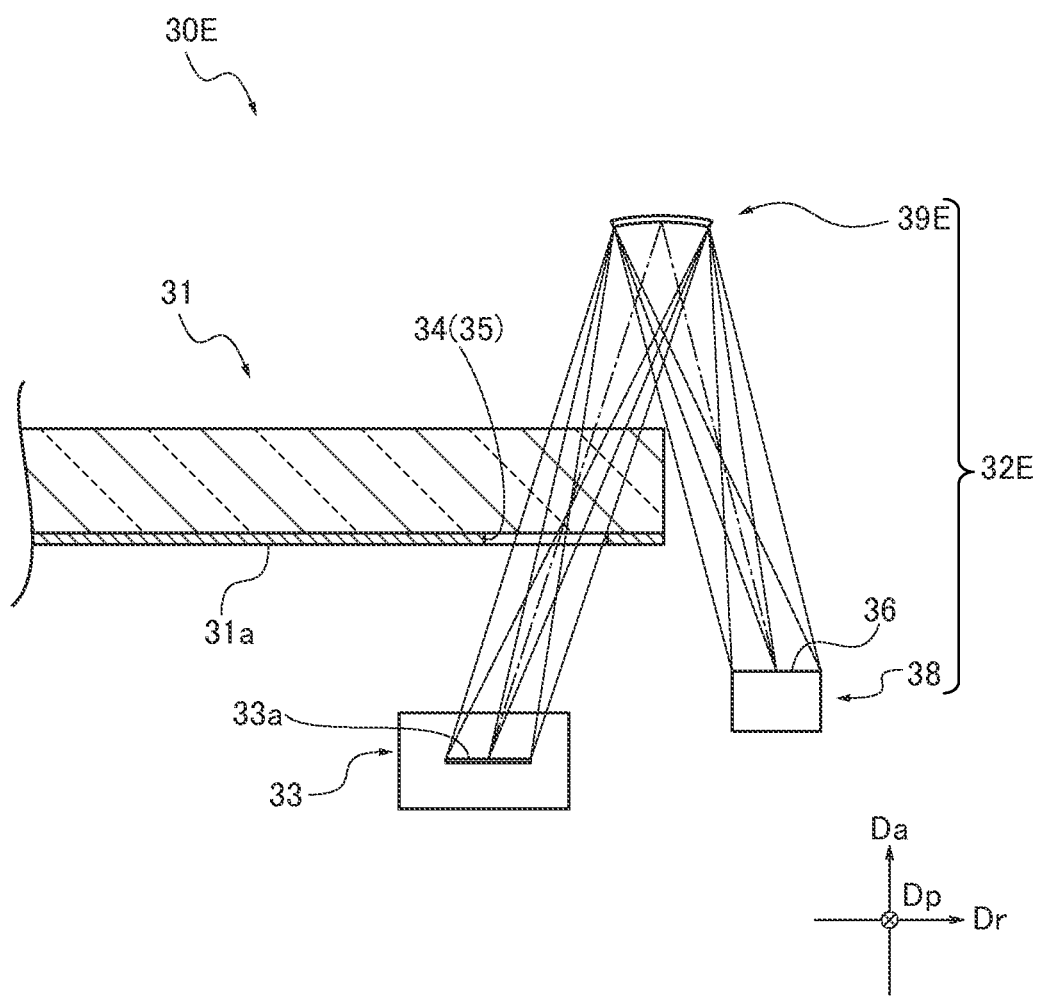
FIG. 16 is an explanatory view explaining a configuration of an absolute encoder in a sixth embodiment.

Next, an absolute encoder 30E according to a sixth embodiment of the present invention and a surveying device 10 installing the absolute encoder 30E thereon are described with reference to FIG. 16. FIG. 16 schematically shows a configuration of the absolute encoder 30E to facilitate understanding thereof, which does not necessarily correspond to an actual form and other drawings.

A configuration of the absolute encoder 30E in the sixth embodiment is basically the same as that of the absolute encoder 30B in the third embodiment described above. Therefore, identical reference numbers are attached to similar parts and a detailed description thereof is omitted. The absolute encoder 30E in the sixth embodiment is an example in which a reflection part 39E in a light-emitting mechanism 32E has a configuration different from the light-emitting mechanism 32B (see FIG. 13) of the absolute encoder 30B in the third embodiment. In addition, the surveying device 10 in the sixth embodiment is the same as that in the first embodiment except for the installation of the absolute encoder 30E in the sixth embodiment. As a result, FIG. 1 is used and a detailed description is omitted.

In the absolute encoder 30E, the light-emitting mechanism 32E includes the light-emitting part 38 and the reflection part 39E, similarly to the light-emitting mechanism 32B (see FIG. 13) of the absolute encoder 30B, as shown in FIG. 16. In the absolute encoder 30E, the reflection part 39E has a configuration different from the reflection part 39 of the absolute encoder 30B. The reflection part 39E is curved so as to image an image of the emission surface 36 on the light-receiving area 33a. In other words, the reflection part 39E is configured such that the emission surface 36 and the light-receiving area 33a have optically conjugate position relations if the light-receiving area 33a is formed as an imaging surface.

In the absolute encoder 30E, a degree of inclination of the irradiation axis $A_r$ relative to the plane including the rotation axis direction $D_a$ and the light-receiving axis direction $D_p$ is set similarly to the third embodiment. That is to say, in the absolute encoder 30E, the reflection part 39 of the light-receiving mechanism 32E in the absolute encoder 30B of the third embodiment is configured to be curved as described above.

Therefore, in the absolute encoder 30E, the outer end reflection detection light $L_{re}$ can be securely prevented from reaching the light-receiving area 33a by setting a position relationship between the light-emitting mechanism 32E (light-emitting part 38 and the reflection part 39E) and the light-receiving mechanism 33 relative to the inner end incident angle θ and the scale plate 31 (scale area 35), similarly to the third embodiment. Therefore, in the absolute encoder 30E, even if the detection light L is reflected on the light-receiving area 33a of the light-receiving mechanism 33 (reflection detection light $L_r$) and the reflection detection light $L_r$ is reflected again on the back surface 31a (chrome plating) of the scale plate 31, the reflection detection light $L_r$ can be securely prevented from reaching the light-receiving area 33a regardless of the reflection position and the travelling direction of the reflection detection light $L_r$.

Because the absolute encoder 30E in the sixth embodiment basically has the same configuration as the absolute encoder 30B in the third embodiment, it is possible to acquire the same advantageous effects as that in the third embodiment, basically.

In addition to that, in the absolute encoder 30E in the sixth embodiment, it is possible to appropriately acquire an image (analog image data) of the scale area 35 (each slit 34) in a position of the light-receiving area 33a according to the rotation position of the scale plate 31 of the light-receiving area 33a by emitting the detection light L from the emission surface 36 of the light-emitting part 38 with uniform brightness. Therefore, in the absolute encoder 30E, it is possible to appropriately execute the angle detection and prevent the reflection detection light $L_r$ from reaching the light-receiving area 33a.

Because the absolute encoder 30E is installed on the surveying device 10 (see FIG. 1), the advantageous effects as described above can be acquired and the measurement of the direction by the surveying unit can be more appropriately executed.

Accordingly, in the absolute encoder 30E according to the sixth embodiment, it is possible to suppress the increase in the manufacturing cost and prevent the accuracy in the angle detection caused by the reflection of the detection light L between the light-receiving area 33a and the scale plate 31 from reducing.

Here, as described above, the absolute encoder 30E in the sixth embodiment has the configuration in which the reflection part 39 of the light-emitting mechanism 32B of the absolute encoder 30B in the third embodiment is curved. However, if the reflection part 39 is curved to image the image on the emission surface 36 on the light-receiving area 33a, this configuration or other configuration may be applied to the absolute encoder 30D in the fourth embodiment, and is not limited to the sixth embodiment.

Embodiment 7

Figure 17:
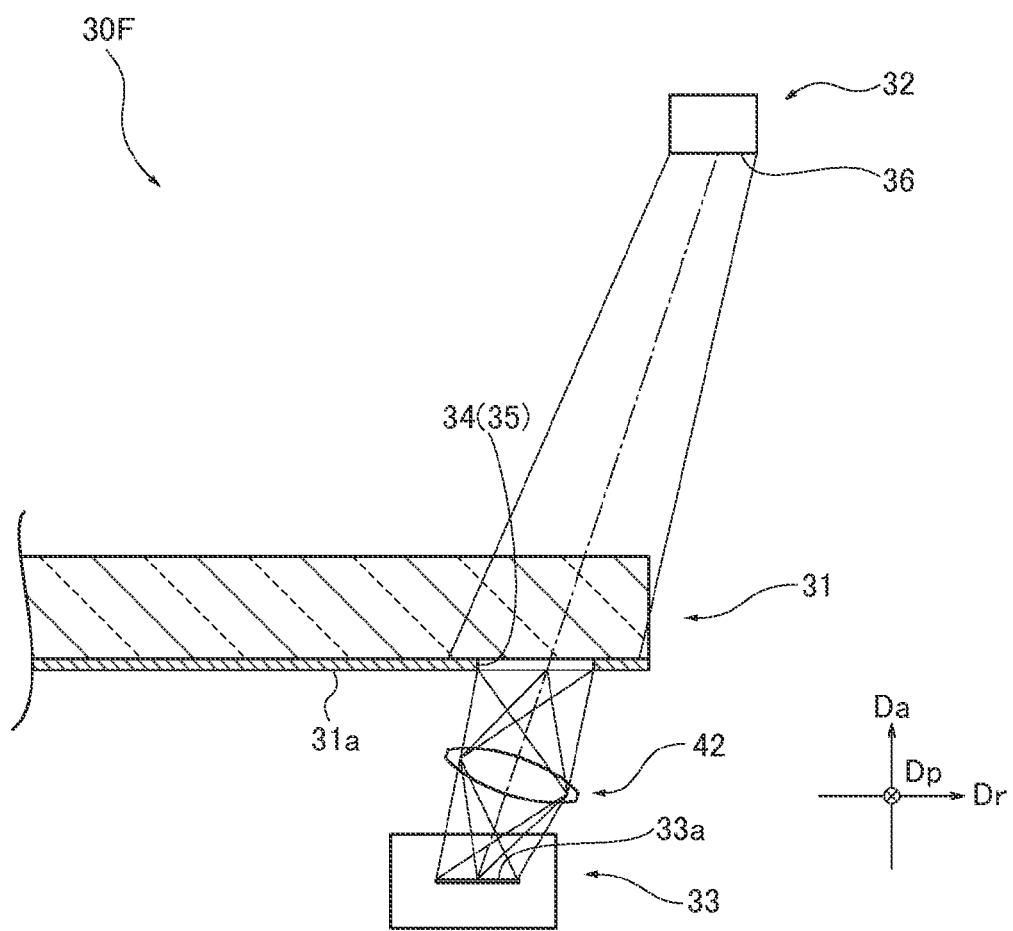
FIG. 17 is an explanatory view explaining a configuration of an absolute encoder in a seventh embodiment.

Next, an absolute encoder 30F according to a seventh embodiment of the present invention and a surveying device 10 installing the absolute encoder 30F thereon are described with reference to FIG. 17. FIG. 17 schematically shows a configuration of the absolute encoder 30 F to facilitate understanding thereof, which does not necessarily correspond to an actual form and other drawings.

The absolute encoder 30F in the seventh embodiment has a configuration in which an imaging lens 42 is provided between the scale plate 31 and the light-receiving mechanism 33 (light-receiving area 33a). A basic configuration of the absolute encoder 30F in the seventh embodiment is the same as that of the absolute encoder 30 in the first embodiment described above. Therefore, identical reference numbers are attached to similar parts and a detailed description thereof is omitted. The surveying device 10 in the seventh embodiment is the same as that in the first embodiment except for the installation of the absolute encoder 30F in the seventh embodiment, and therefore, is as shown in FIG. 1, a detailed description thereof is omitted.

In the absolute encoder 30F, the imaging lens 42 is provided between the scale plate 31 (scale area 35) and the light-receiving mechanism 33 (light-receiving area 33a), as shown in FIG. 17. The imaging lens 42 images the image of the scale area 35 (each slit 34) in the scale plate 31 on the light-receiving area 33a. In other words, the imaging lens 42 is configured such that a position relationship between the scale area 35 and the light-receiving area 33a as an imaging surface is optically conjugate. Therefore, the imaging lens 42 functions as an imaging optical mechanism.

In the absolute encoder 30F, a degree of inclination of the irradiation axis $A_r$ relative to the plane including the rotation axis direction $D_a$ and the light-receiving axis direction $D_p$ is set similarly to the first embodiment. To execute the setting, the absolute encoder 30F has the configuration in which the imaging lens 42 as the imaging optical mechanism is provided between the scale plate 31 and the light-receiving mechanism 33 (light-receiving area 33a) in the absolute encoder 30 according to the first embodiment.

Therefore, in the absolute encoder 30F, the outer end reflection detection light $L_{re}$ can be securely prevented from reaching the light-receiving area 33a by setting a position relationship between the light-emitting mechanism 32 and the light-receiving mechanism 33 relative to the inner end incident angle θ and the scale plate 31 (scale area 35), similarly to the first embodiment. Therefore, in the absolute encoder 30F, even if the detection light L is reflected on the light-receiving area 33a of the light-receiving mechanism 33 (reflection detection light $L_r$) and the reflection detection light $L_r$ is reflected again on the back surface 31a (chrome plating) of the scale plate 31, the reflection detection light $L_r$ can be securely prevented from reaching the light-receiving area 33a regardless of the reflection position and the travelling direction of the reflection detection light $L_r$.

Because the absolute encoder 30F in the seventh embodiment basically has the same configuration as the absolute encoder 30 in the first embodiment, it is possible to acquire the same advantageous effects as that in the first embodiment, basically.

In addition to that, in the absolute encoder 30F in the seventh embodiment, it is possible to image on the light-receiving area 33a an image in a state where the detection light L transmits only each slit 34 in the scale area 35. Therefore, in the absolute encoder 30F, it is possible to more appropriately acquire on the light-receiving area 33a the image (analog image data) of the scale area 35 (each slit 34) in the position according to the rotation position of the scale plate 31. Thereby, in the absolute encoder 30F, it is possible to more appropriately execute the angle detection and prevent the reflection detection light $L_r$ from reaching the light-receiving area 33a.

Because the absolute encoder 30F is installed on the surveying device 10 (see FIG. 1), the advantageous effects as described above can be acquired and the measurement of the direction by the surveying unit can be more appropriately accomplished.

Accordingly, in the absolute encoder 30F according to the seventh embodiment, it is possible to suppress the increase in the manufacturing cost and prevent the accuracy in the angle detection caused by the reflection of the detection light L between the light-receiving area 33a and the scale plate 31 from reducing.

The seventh embodiment is the absolute encoder 30F having the configuration in which the imaging lens 42 as the imaging optical mechanism is provided between the scale plate 31 and the light-receiving mechanism 33 (light-receiving area 33a) in the absolute encoder 30 in the first embodiment. However, if the imaging optical mechanism is provided between the scale plate 31 and the light-receiving mechanism 33 (light-receiving area 33a) to image the image of the scale area 35 (each slit 34) on the light-receiving area 33a, the imaging optical mechanism (imaging lens 42) may be provided on each of the absolute encoders 30A, 30B, 30C and 30D according to the second to fifth embodiments, using the imaging optical mechanism is not limited to the seventh embodiment.

As described above, each of the absolute encoders 30, 30A, 30B, 30C, 30D, 30E and 30F according to the present invention includes the light-emitting mechanism that irradiates the detection light emitted from the emission surface and the light-receiving mechanism having the light-receiving area that receives the detection light emitted from the emission surface and passing through the scale area of the scale plate. The light-emitting mechanism and the light-receiving mechanism are set to the position relationship that inclines the irradiation axis extending from the light-emitting surface through the scale area to the light-receiving area relative to the rotation axis direction of the scale plate.

In each embodiment as described above, although the irradiation axis $A_r$ is inclined relative to the plane including the rotation axis direction Da and the light-receiving axis direction $D_p$, the irradiation axis $A_r$ may be inclined relative to the rotation axis direction $D_a$ to prevent the reflection detection light $L_r$ from reaching the light-receiving area 33.

Although the light-emitting mechanism (32 and so on) is positioned in the positive side (outer side as viewed in the radial direction $D_r$) of the radial direction $D_r$ than the light-receiving mechanism 33, the light-emitting mechanism (32 and so on) may be positioned in the negative side (inner side as viewed in the radial direction $D_r$) of the radial direction $D_r$ than the light-receiving mechanism 33, if the irradiation axis $A_r$ is inclined relative to the plane including the rotation axis direction $D_a$ and the light-receiving axis direction $D_p$.

In each embodiment as described above, although the single control mechanism 37 is provided for the two absolute encoders 30, the control mechanism 37 may be provided for each absolute encoder 30.

In each embodiment as described above, although the absolute encoders 30 are provided on the surveying device 10, the angle detection may be executed at the same time by use of a plurality of light-receiving mechanisms.

Although the several embodiments of the present invention have been described, it should be noted that the present invention is not limited to these embodiments, various modifications and changes can be made to the embodiments by those skilled in the art as long as such modifications and changes are within the scope of the present invention as defined by the Claims.

What is claimed is:
1. An absolute encoder comprising:
   a light-emitting mechanism including an emission surface that emits light as detection light; and
   a light-receiving mechanism including a scale plate having a scale area and a light-receiving area configured to receive the detection light emitted from the emission surface and passing through the scale area of the scale plate, wherein
   the light-receiving area is formed to linearly extend in a light-receiving axis direction,
   the scale plate has a disc-like shape,
   the light-emitting mechanism is positioned in an outer side than the scale area in a radial direction of the scale plate,
   the light-receiving mechanism is positioned in an inner side than the scale area in the radial direction of the scale plate and is set to a position relationship in which the light-receiving axis direction is a direction parallel to a chord of the disk-like shape of the scale plate, the light-emitting mechanism and the light-receiving mechanism are set to a position relationship that inclines an irradiation axis extending from the emission surface through the scale area to the light-receiving area relative to a plane including the light-receiving axis direction and being parallel to a rotation axis direction of the scale plate, the detection light which is emitted from an inner end position at the emission surface in the radial direction and which directs to an outer end position at the light-receiving area in the radial direction is formed as inner end detection light, and reflection detection light in which the inner end detection light is reflected on the light-receiving area toward the scale plate is formed as outer end reflection detection light, the position relationship between the light-emitting mechanism and the light-receiving mechanism is set by setting an inner end incident angle of the inner end detection light relative to the plane including the light-receiving axis direction and parallel to the rotation axis direction to prevent the outer end reflection detection light from being reflected again on the scale plate and reaching the light-receiving area.

2. The absolute encoder according to claim 1, wherein the light-emitting mechanism includes a light-emitting part that emits the detection light to form the emission surface and a reflection part that reflects the detection light emitted from the light-receiving part toward the scale area.

3. The absolute encoder according to claim 1, wherein the light-emitting mechanism includes a light-emitting part that emits the detection light to form the emission surface and a reflection part that reflects the detection light emitted from the light-emitting part toward the scale area, and the inner end incident angle is set by adding an inclination angle of the reflection part relative to the scale plate.

4. The absolute encoder according to claim 1, wherein the inner end incident angle is set by adding an inclination angle of the reflection part relative to the scale plate.

5. The absolute encoder according to claim 1, further comprising a collimating optical mechanism provided between the emission surface and the scale plate and configured to form the detection light in parallel light.

6. The absolute encoder according to claim 1, wherein the light-emitting mechanism includes a light-emitting part that emits the detection light to form the emission surface and a reflection part that reflects the detection light emitted from the light-emitting part toward the scale area, and the reflection part is curved to image an image of the emission surface on the light-receiving area.

7. The absolute encoder according to claim 1, further comprising an imaging optical mechanism provided between the scale plate and the light-receiving mechanism and configured to image an image of the scale area on the light-receiving area.

8. A surveying device comprising:

the absolute encoder claimed in claim 1;

a surveying unit capable of measuring a distance to and a direction of an object; and a control unit that controls the surveying unit.

9. A method of producing an absolute rotary encoder, comprising:

positioning a light-emitting mechanism that irradiates light from a light-emission surface as detection light in an outer side than a scale area in a radial direction of a disc-shaped scale plate;

positioning a light-receiving mechanism that receives the detection light passing through the scale area by a light-receiving area in an inner side than the scale area in the radial direction of the scale plate such that a light-receiving axis direction is parallel to a chord of the disc-like shaped scale plate;

inclining an irradiation axis extending from the light-emission surface through the scale area to the light-receiving area relative to a plane including the light-receiving axis direction and being parallel to a rotation axis direction of the scale plate; and when the detection light which is emitted from an inner end position at the emission surface in the radial direction and which directs to an outer end position at the light-receiving area in the radial direction is defined as inner end detection light, and reflection detection light in which the inner end detection light is reflected on the light-receiving area toward the scale plate is defined as outer end reflection detection light, arranging a positional relationship between the light-emitting mechanism and the light-receiving mechanism by setting an inner end incident angle of the inner end detection light relative to the plane including the light-receiving axis direction and parallel to the rotation axis direction so as to prevent the outer end reflection detection light from being reflected on the scale plate and reaching the light-receiving area.

* * * * *